United States Patent
Zhu et al.

(10) Patent No.: US 11,184,078 B2
(45) Date of Patent: Nov. 23, 2021

(54) DATA TRANSMISSION METHOD AND APPARATUS

(71) Applicant: BEIJING XIAOMI MOBILE SOFTWARE CO., LTD., Beijing (CN)

(72) Inventors: Yajun Zhu, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/833,519

(22) Filed: Mar. 28, 2020

(65) Prior Publication Data

US 2020/0228186 A1 Jul. 16, 2020

Related U.S. Application Data

(63) Continuation of application No. PCT/CN2017/104987, filed on Sep. 30, 2017.

(51) Int. Cl.
*H04B 7/06* (2006.01)

(52) U.S. Cl.
CPC .......... *H04B 7/0695* (2013.01); *H04B 7/063* (2013.01)

(58) Field of Classification Search
CPC ... H04B 7/00; H04B 7/02; H04B 7/04; H04B 7/0408; H04B 7/0413; H04B 7/06; H04B 7/0686; H04B 7/0695; H04B 7/063; H04B 7/0639
See application file for complete search history.

(56) References Cited

U.S. PATENT DOCUMENTS

| | | | | |
|---|---|---|---|---|
| 10,116,370 | B2* | 10/2018 | Obara | H04B 7/10 |
| 10,367,677 | B2* | 7/2019 | Parkvall | H04B 7/0617 |
| 10,389,424 | B2* | 8/2019 | Jalden | H04B 7/0634 |
| 10,506,533 | B2* | 12/2019 | Choi | H04B 7/088 |
| 10,574,308 | B2* | 2/2020 | Wernersson | H04B 7/0473 |

(Continued)

FOREIGN PATENT DOCUMENTS

| | | |
|---|---|---|
| CN | 101453255 A | 6/2009 |
| CN | 104303477 A | 1/2015 |

(Continued)

OTHER PUBLICATIONS

International Search Report in the international application No. PCT/CN2017/104987, dated May 30, 2018.

(Continued)

*Primary Examiner* — James M Perez
(74) *Attorney, Agent, or Firm* — Syncoda LLC; Feng Ma

(57) ABSTRACT

A data transmission method includes: receiving beam configuration information sent by a base station; according to the beam configuration information, obtaining a plurality of candidate beams from among a plurality of beams supported by the base station; performing data reception according to the plurality of candidate beams. A plurality of candidate beams can therefore be obtained from among a plurality of beams supported by a base station according to beam configuration information sent by the base station, and thus perform data reception according to the plurality of candidate beams, thereby implementing a multi-beam data reception solution, reducing the probability of packet loss during data reception, and increasing the reliability of data reception.

20 Claims, 27 Drawing Sheets

(56) References Cited

U.S. PATENT DOCUMENTS

| | | | |
|---|---|---|---|
| 10,693,522 B1* | 6/2020 | Kim | H04B 1/71 |
| 10,784,950 B2* | 9/2020 | Kang | H04W 48/16 |
| 10,790,896 B2* | 9/2020 | Li | H04B 17/327 |
| 10,813,079 B2* | 10/2020 | Liu | H04W 52/0216 |
| 10,917,160 B2* | 2/2021 | Miyazaki | H04B 7/0452 |
| 10,931,514 B2* | 2/2021 | Xia | H04W 74/006 |
| 10,999,770 B2* | 5/2021 | Li | H04W 36/0083 |
| 11,018,748 B2* | 5/2021 | Li | H04B 7/0626 |
| 11,050,478 B2* | 6/2021 | Guo | H04W 72/042 |
| 2002/0181437 A1 | 12/2002 | Ohkubo | |
| 2005/0037799 A1* | 2/2005 | Braun | H04W 16/28 455/525 |
| 2013/0072247 A1* | 3/2013 | Park | H04B 7/043 455/513 |
| 2013/0301454 A1* | 11/2013 | Seol | H04B 7/0695 370/252 |
| 2015/0249995 A1* | 9/2015 | Park | H04B 7/0408 370/329 |
| 2016/0197659 A1* | 7/2016 | Yu | H04J 13/0003 370/335 |
| 2016/0269093 A1* | 9/2016 | Seol | H04B 7/043 |
| 2016/0338033 A1* | 11/2016 | Xiao | H04W 28/18 |
| 2017/0012692 A1* | 1/2017 | Kim | H04B 7/0695 |
| 2017/0094531 A1* | 3/2017 | Kakishima | H04W 24/10 |
| 2017/0150487 A1* | 5/2017 | Zhou | H04B 7/0626 |
| 2017/0331670 A1* | 11/2017 | Parkvall | H04L 41/0233 |
| 2018/0302889 A1* | 10/2018 | Guo | H04B 7/0617 |
| 2018/0310283 A1* | 10/2018 | Deenoo | H04L 5/0048 |
| 2019/0069285 A1* | 2/2019 | Chandrasekhar | H04B 7/0695 |
| 2019/0089499 A1* | 3/2019 | Nam | H04B 7/0617 |
| 2019/0190582 A1* | 6/2019 | Guo | H04B 7/0695 |
| 2019/0313308 A1* | 10/2019 | Li | H04W 72/046 |
| 2019/0319682 A1* | 10/2019 | Zhang | H04B 7/0617 |
| 2019/0327632 A1* | 10/2019 | Kim | H04B 7/0695 |
| 2019/0335430 A1* | 10/2019 | Ljung | H04W 72/042 |
| 2019/0364445 A1* | 11/2019 | Kang | H04W 74/0833 |
| 2019/0394787 A1* | 12/2019 | Mashino | H04W 72/1231 |
| 2020/0021350 A1* | 1/2020 | Koskela | H04B 7/0639 |
| 2020/0021352 A1* | 1/2020 | Miyazaki | H04B 7/0857 |
| 2020/0059398 A1* | 2/2020 | Pan | H04W 72/0413 |
| 2020/0106513 A1* | 4/2020 | Islam | H04B 7/0404 |
| 2020/0228186 A1* | 7/2020 | Zhu | H04B 7/088 |
| 2020/0244413 A1* | 7/2020 | Takeda | H04L 5/0048 |
| 2020/0259531 A1* | 8/2020 | Zhu | H04B 7/0617 |
| 2020/0374960 A1* | 11/2020 | Deenoo | H04W 72/14 |

FOREIGN PATENT DOCUMENTS

| | | |
|---|---|---|
| CN | 104396152 A | 3/2015 |
| CN | 106105292 A | 11/2016 |
| CN | 106171011 A | 11/2016 |
| CN | 106385710 A | 2/2017 |
| CN | 106470062 A | 3/2017 |
| CN | 106797606 A | 5/2017 |
| EP | 3122094 A1 | 1/2017 |
| WO | 2016023227 A1 | 2/2016 |
| WO | 2017083514 A1 | 5/2017 |
| WO | 2017111642 A1 | 6/2017 |

OTHER PUBLICATIONS

English translation of the Written Opinion of the International Search Authority in the international application No. PCT/CN2017/104987, dated May 30, 2018.

Qualcom Jncorporated. "3GPPTSG-RAN WG1 #86bis R1-1610165", Multi-Beam RACH Procedure Aspects, Oct. 14, 2016 (Oct. 14, 2016), entire document.

Supplementary European Search Report in the European application No. 17894759.4, dated Jun. 16, 2020.

\* cited by examiner

Device for data transmission 60

Third sending portion 602

FIG. 6A

DATA TRANSMISSION METHOD AND APPARATUS

CROSS-REFERENCE TO RELATED APPLICATION

The present application is a continuation of International Application No. PCT/CN2017/104987 filed on Sep. 30, 2017, the disclosure of which is hereby incorporated by reference in its entirety.

BACKGROUND

In a new-generation wireless cellular network system, a base station may work in a relatively high frequency band. For solving the problem of relatively high path loss caused by increase of a carrier frequency, the communication system may provide service for a terminal by use of a multi-beam technology.

SUMMARY

The present disclosure generally relates to the technical field of communication, and more specifically to a method and a device for data transmission.

Embodiments of the present disclosure provide a method and a device for data transmission. The technical solutions are implemented as follows.

According to a first aspect of the embodiments of the present disclosure, there is provided a method for data transmission, which may be applied to a terminal and include that:

beam configuration information sent by a base station is received;

multiple candidate beams are acquired, from multiple beams which are supported by the base station, according to the beam configuration information; and data is received according to the multiple candidate beams.

According to a second aspect of the embodiments of the present disclosure, there is provided a method for data transmission, which may be applied to a base station and include that:

beam configuration information is sent to a terminal such that the terminal selects, according to the beam configuration information, multiple candidate beams from multiple beams which are supported by the base station, and receives data according to the multiple candidate beams.

According to a third aspect of the embodiments of the present disclosure, a device for data transmission is provided, which may include:

a processor; and a memory configured to store an instruction executable for the processor, wherein the processor is configured to:

receive beam configuration information sent by a base station;

acquire, according to the beam configuration information, multiple candidate beams from multiple beams which are supported by the base station; and receive data according to the multiple candidate beams.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

FIG. 6A is a structure diagram of a device for data transmission, according to some embodiments of the present disclosure.

DETAILED DESCRIPTION

Figure 1A:
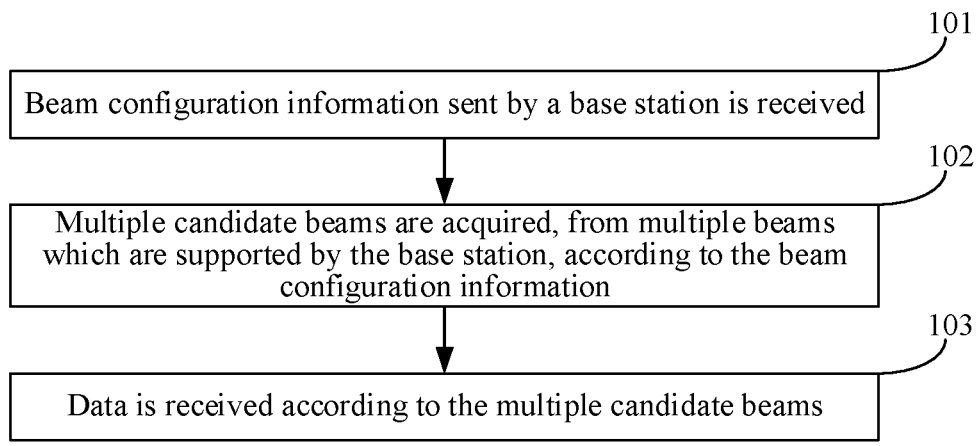
FIG. 1A is a flowchart showing a method for data transmission for a terminal side, according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Typically, a base station may regulate sending parameter information of multiple antennae in an antenna array, and send a high-frequency beam to a direction of a terminal by use of the multiple antennae. The terminal, after accessing the high-frequency beam, may establish a communication connection with the base station via a communication resource of the high-frequency beam, thereby receiving information through the high-frequency beam.

The technical solutions provided in some embodiments of the present disclosure relate to a terminal and a base station. The terminal is connected with the base station through a mobile communication network. The terminal may be a mobile phone, a tablet computer, a smart watch and another device with a mobile communication function. There are no limits made thereto in the embodiments of the present disclosure. Typically, a base station may support data transmission of multiple beams; the base station, after the terminal accessing the base station, may configure the beam, for data transmission for the terminal, of the multiple beams, and then the terminal may access the beam for data interaction according to a configuration of the base station. However, the number of terminals in a cell covered by the base station may be relatively large, and when the base station configures beams for different terminals, there may inevitably be such a condition that multiple terminals access the same beam. If many terminals access the beam or the base station is required to send a large number of data packets to all the terminals accessing the beam, data packet loss is very likely to occur during data reception of the terminals, resulting in unreliable data reception and reducing data receiving effectiveness. In the technical solutions provided in various embodiments of the present disclosure, the terminal may acquire, according to beam configuration information sent by the base station, multiple candidate beams from multiple beams which are supported by the base station, and further receive data sent by the base station according to the multiple candidate beams, so that a multi-beam data receiving solution is implemented, a probability of packet loss in a process that the base station sends the data to the terminal is reduced, and data receiving reliability and data receiving effectiveness are improved.

The embodiments of the present disclosure provide a method for data transmission. Execution bodies implementing the method include a terminal and a base station. According to the embodiments of the present disclosure, two sets of embodiments are presented as follows according to different implementation bodies of the method.

Various embodiments of the present disclosure are first described from a perspective of a terminal side.

FIG. 1A is a flowchart showing a method for data transmission, according to some embodiments of the present disclosure. The method for data transmission is applied to a terminal. As shown in FIG. 1A, the method includes the following Block 101 to Block 103.

In Block 101, beam configuration information sent by a base station is received.

Exemplarily, the beam configuration information may include pilot configuration information and beam transmission information of the multiple beams. The pilot configuration information indicates a pilot configuration of each of the multiple beams which are supported by the base station, and the beam transmission information indicates a time-frequency resource for transmission of each of the multiple beams. The time-frequency resource may be a slot or a symbol, a subframe, a radio frame or a time-domain unit of another type on a time domain, and may be a continuous or discontinuous Physical Resource Block (PRB), a bandwidth part or a frequency-domain unit of another type on a frequency domain. There are no limits made thereto in the embodiment of the present disclosure.

During initialization, the base station may transmit initial access signals through the multiple beams which are supported by the base station; and the terminal, after entering a region covered by the base station, may search for the initial access signals to access the beams of the base station for data transmission. Since the base station transmits the initial access signals through the multiple beams, the terminal may find the initial access signals of one or more beams. Under the circumstance that the terminal may receive the initial access signals of the multiple beams, the terminal may determine an optimal beam as a service beam according to the initial access signals of the multiple beams, and access the service beam for data transmission according to an instruction of the base station. During data transmission of the terminal with the service beam, the base station or the terminal may determine whether the number of data packets required to be transmitted to the terminal by the base station in a reference preset time period is greater than or equal to a reference preset threshold value or not in real time. If the number of the data packets required to be transmitted to the terminal by the base station in the reference preset time period is greater than or equal to the reference preset threshold value, it is indicated that the terminal is required to receive data via a large number of time-frequency resources in a short time. In such case, if the terminal only accesses the service beam, a solution for rapidly receiving data packets may not be implemented. Thus the terminal may send a resource configuration request to the base station, and the base station, after receiving the resource configuration request sent by the terminal, sends the beam configuration information to the terminal.

Or, the base station may determine whether the number of terminals accessing the service beams is greater than or equal to a preset number threshold value or not. If the number of the terminals accessing the service beam is greater than or equal to the preset number threshold value, it is indicated that relatively few time-frequency resources are available for each terminal and it is difficult to ensure data receiving reliability of the terminal. Thus, the beam configuration information may be sent to the terminal. Of course, there are other conditions triggering configuration of the multiple beams for the terminal. There are no limits made thereto in the embodiment of the present disclosure.

In some embodiments, the base station may send the beam configuration information to the terminal through Radio Resource Control (RRC) signaling, a Media Access Control-Control Element (MAC CE) or physical-layer signaling.

In some embodiments, the multiple beams may be all beams which are supported by the base station and may also be part of all the beams which are supported by the base station. There are no limits made thereto in the embodiment of the present disclosure.

In Block 102, multiple candidate beams are acquired, according to the beam configuration information, from multiple beams which are supported by the base station.

Exemplarily, the terminal, after receiving the beam configuration information, may measure the multiple beams according to the pilot configuration and time-frequency resource, indicated in the beam configuration information, of each of the multiple beams which are supported by the base station. Measurement results reflecting signal strength of different beams at a present position of the terminal, and then the terminal may select the multiple candidate beams with relatively high signal strength from the multiple beams according to the measurement results. The multiple candidate beams may include the service beam presently accessed by the terminal and may also not include the service beam.

In Block 103, data is received according to the multiple candidate beams.

Exemplarily, the terminal, after acquiring the multiple candidate beams, may acquire the multiple time-frequency resources for transmission of the multiple candidate beams according to an instruction of the base station, and receive the data on the multiple time-frequency resources for transmission of the multiple candidate beams via the multiple candidate beams.

In the technical solution provided in the embodiment of the present disclosure, the terminal may acquire, according to the beam configuration information sent by the base station, the multiple candidate beams from the multiple beams which are supported by the base station; and further receive, according to the multiple candidate beams, the data sent by the base station, so that a multi-beam data receiving solution is implemented, a probability of packet loss in a process that the base station sends the data to the terminal is reduced, and data receiving reliability and data receiving effectiveness are improved.

Figure 1B:
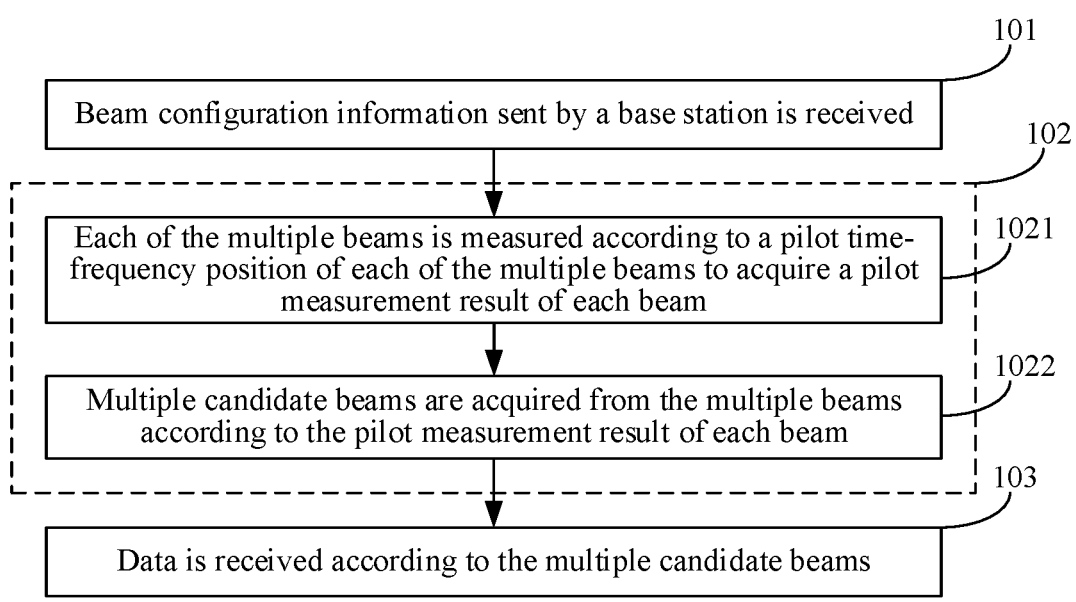
FIG. 1B is a flowchart showing a method for data transmission for a terminal side, according to some embodiments of the present disclosure.

In some embodiments, the pilot configuration information includes a pilot time-frequency position and pilot sending strength. As shown in FIG. 1B, the operation in Block 102 that the multiple candidate beams are acquired, according to the beam configuration information, from the multiple beams which are supported by the base station may be implemented by Block 1021 and Block 1022.

In Block 1021, each of the multiple beams is measured according to the pilot time-frequency position of each of the multiple beams to acquire a pilot measurement result of each beam.

In Block 1022, the multiple candidate beams are acquired from the multiple beams according to the pilot measurement result of each beam.

Exemplarily, the terminal may acquire the pilot configuration information and beam transmission information of each of the multiple beams according to the beam configuration information to further acquire the pilot time-frequency position and pilot sending strength of each beam. The pilot sending beam may be signal strength during transmission of a pilot of each beam by the base station. The pilot sending strength of different beams may be the same and may also be different.

The terminal may determine, according to the time-frequency resource and pilot time-frequency position for transmission of each beam, pilot time when the pilot of each beam may be received, and then receive the pilot of each beam on the pilot time corresponding to each beam. Such a receiving process is a measurement process for each beam. Pilot receiving strength of each beam may be acquired according to the pilot measurement result of each beam. The pilot receiving strength may be the signal strength of the pilot received by the terminal. The terminal may determine the signal strength of different beams at the present position according to the pilot sending strength and pilot receiving strength of each beam, and further select multiple beams with relatively high signal strength as the multiple candidate beams. For example, the terminal may calculate a first difference between the pilot sending strength and the pilot receiving strength of each beam, and then determine multiple beams of which the first differences are less than or equal to a first difference threshold value as the candidate beams. Or the terminal may arrange the multiple beams according to a sequence from small to large first differences, and then select the first N beams as the candidate beams, and N may be an integer greater than or equal to 2.

Figure 1C:
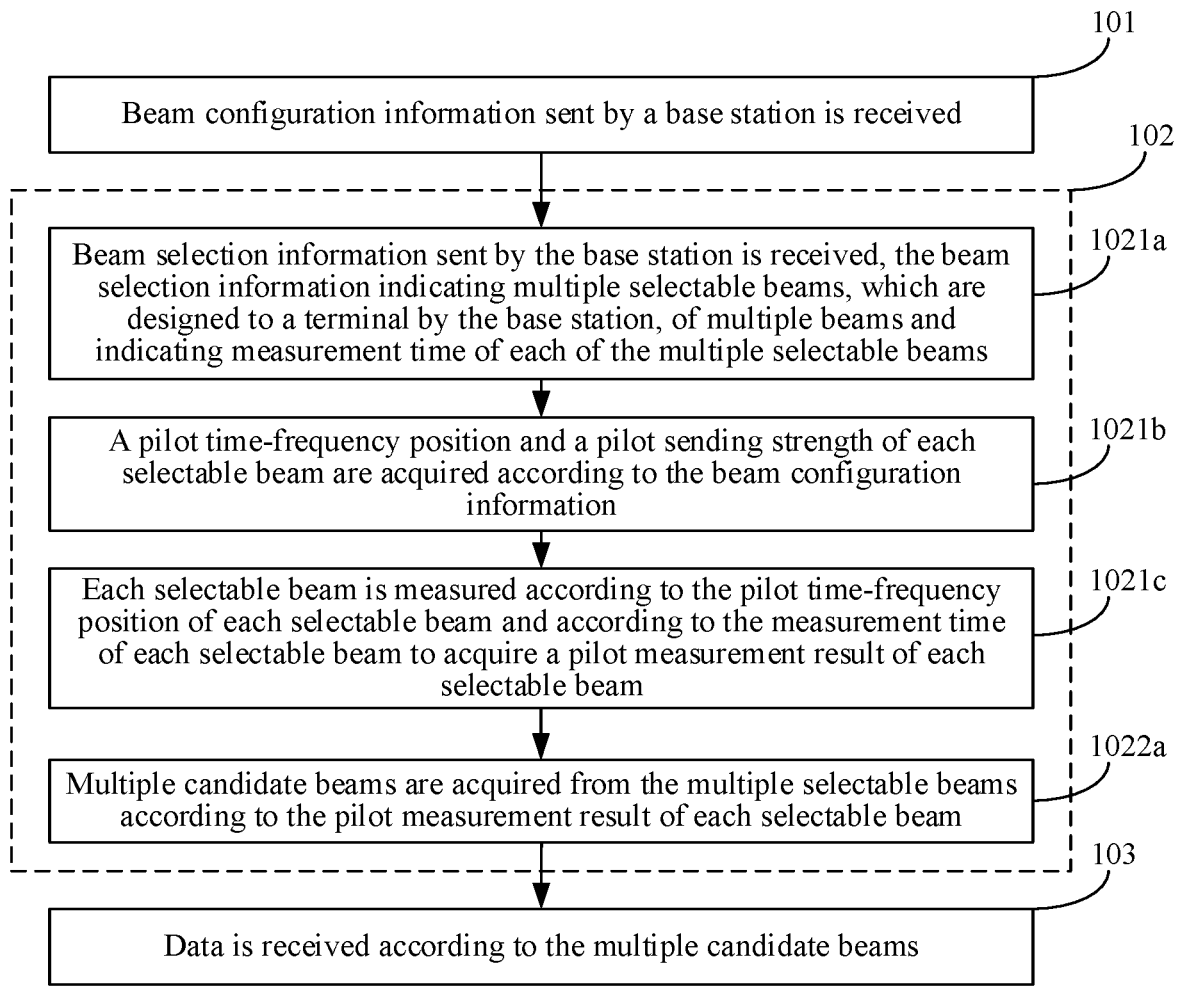
FIG. 1C is a flowchart showing a method for data transmission for a terminal side, according to some embodiments of the present disclosure.

In some embodiments, as shown in FIG. 1C, the operation in Block 1021 that each beam is measured according to the pilot time-frequency position of each of the multiple beams to acquire the pilot measurement result of the beam may be implemented by Block 1021a to Block 1021c. The operation in Block 1022 that the multiple candidate beams are acquired from the multiple beams according to the pilot measurement result of each beam may be implemented by Block 1022a.

In Block 1021a, beam selection information sent by the base station is received, and the beam selection information indicates multiple selectable beams, which are designed by the base station to the terminal, of the multiple beams, and indicates measurement time of each of the multiple selectable beams.

In Block 1021b, the pilot time-frequency position and pilot sending strength of each selectable beam are acquired according to the beam configuration information.

In Block 1021c, each selectable beam is measured according to the pilot time-frequency position of the selectable beam and according to the measurement time of the selectable beam to acquire the pilot measurement result of the selectable beam.

In Block 1022a, the multiple candidate beams are acquired from the multiple selectable beams according to the pilot measurement result of each selectable beam.

Exemplarily, the base station may also configure the multiple candidate beams of the multiple beams for the terminal according to the position of the terminal such that the terminal acquires the multiple candidate beams from the multiple selectable beams. For example, the base station may acquire the position of the terminal, and select, according to the position of the terminal and the transmission direction of each beam, beams having angles between transmission directions of which and a direction of the terminal are less than or equal to a preset angle threshold value, from the multiple beams as the selectable beams. Or, the base station may determine multiple beams of which service regions are in a sector where the terminal is located as the selectable beams according to the position of the terminal and a service region of each beam, the service region of a beam may be a coverage region of signals of the beam. The base station, after designating the multiple selectable beams for the terminal, may further indicate the measurement time for measurement of each pilot by the terminal according to the pilot time-frequency position of each selectable beam such that the terminal receives the pilot of each selectable beam according to the measurement time.

The base station, after designating the multiple selectable beams and the measurement time of each selectable beam, may generate the beam selection information according to a designation result and send the beam selection information to the terminal. The beam selection information may include a beam identifier of each selectable beam and the measurement time corresponding to each beam identifier. In some embodiments, the base station may send the beam selection information to the terminal through RRC signaling, a MAC CE or physical-layer signaling.

The terminal, after receiving the beam selection information, may determine the multiple selectable beams according to the multiple beam identifiers in the beam selection information, then acquire the pilot time-frequency positions of the multiple selectable beam from the pilot configuration information of each beam in the beam configuration information, and measure each selectable beam according to the measurement time of each selectable beam designed by the base station to acquire the pilot measurement result of each selectable beam. The pilot measurement result of each selectable beam may be the pilot receiving strength of each selectable beam. The terminal may determine the signal strength of different selectable beams at the present position according to the pilot sending strength and pilot receiving strength of each selectable beam, and further select multiple selectable beams with relatively high signal strength as the candidate beams. For example, the terminal may calculate a second difference between the pilot sending strength and pilot receiving strength of each selectable beam, and then determine multiple selectable beams of which the second differences are less than or equal to a second difference threshold value as the candidate beams. Or the terminal may arrange the multiple selectable beams according to a sequence from small to large second differences, and then select the first N selectable beams as the candidate beams, N may be an integer greater than or equal to 2.

Figure 1D:
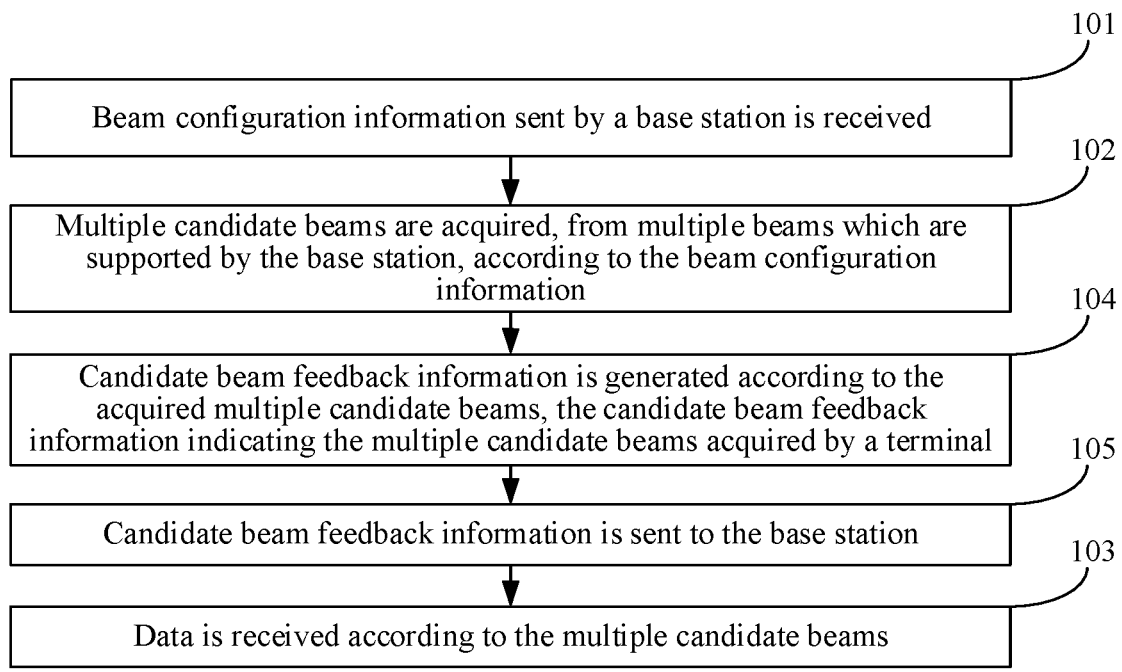
FIG. 1D is a flowchart showing a method for data transmission for a terminal side, according to some embodiments of the present disclosure.

In some embodiments, as shown in FIG. 1D, the method further includes Block 104 and Block 105.

In Block 104, candidate beam feedback information is generated according to the acquired multiple candidate beams, and the candidate beam feedback information indicates the multiple candidate beams acquired by the terminal.

In Block 105, the candidate beam feedback information is sent to the base station.

Exemplarily, the terminal, after acquiring the multiple candidate beams, may generate the candidate beam feedback information according to an acquisition result, and send the candidate beam feedback information to the base station such that the base station to learn about the multiple candidate beams selected by the terminal. In some embodiments, the candidate beam feedback information may include the beam identifiers of the multiple candidate beams, and the base station, after receiving the candidate beam feedback information, may determine, according to the multiple candidate identifiers in the candidate beam feedback information, the multiple candidate beams selected by the terminal.

In some embodiments, the terminal may send the candidate beam feedback information to the base station via a preset time-frequency resource. Exemplarily, during initialization, the base station and the terminal predetermine that a first time-frequency resource of each resource block of the service beam may be available for uploading the candidate beam feedback information. The terminal, after generating the candidate beam feedback information, may transmit the candidate beam feedback information on the first time-frequency resource of the next resource block that is received.

Or, the base station may also preconfigure the time-frequency resource for uploading the candidate beam feedback information for the terminal. For example, the base station, after sending the beam configuration information or the beam selection information to the terminal, may send first resource configuration information to the terminal. The first resource configuration information includes the time-frequency resource which is designed by the base station to the terminal and is used to send the candidate beam feedback information. The terminal, after generating the candidate beam feedback information, may send the candidate beam feedback information to the base station according to the time-frequency resource which is designed by the base station. For example, if the first resource configuration information sent by the base station indicates that the first time-frequency resource of the next resource block of the service beam is the time-frequency resource used for uploading the candidate beam feedback information, the terminal, after generating the beam feedback information, may transmit the candidate beam feedback information on the first time-frequency resource of the next resource block that is received.

Figure 1E:
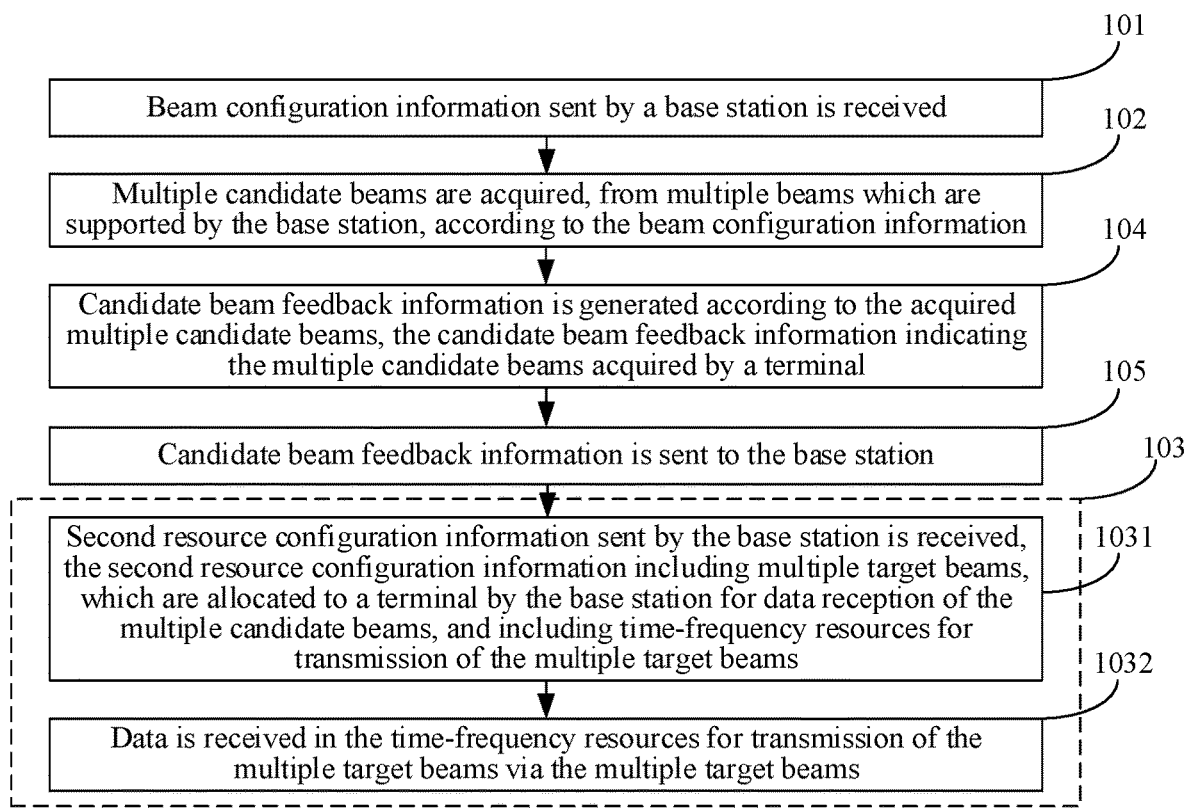
FIG. 1E is a flowchart showing a method for data transmission for a terminal side, according to some embodiments of the present disclosure.

In some embodiments, as shown in FIG. 1E, the operation in Block 103 that the data is received according to the multiple candidate beams may be implemented by Block 1031 and Block 1032.

In Block 1031, second resource configuration information sent by the base station is received, and the second resource configuration information includes multiple target beams, which are allocated to the terminal by the base station for data reception, of the multiple candidate beams, and includes the time-frequency resources for transmission of the multiple target beams.

In Block 1032, the data is received in the time-frequency resources for transmission of the multiple target beams via the multiple target beams.

Exemplarily, the base station, after receiving the candidate beam feedback information sent by the terminal, may allocate to the terminal the target beams that may be accessed in the multiple candidate beams indicated by the candidate beam feedback information, and the multiple target time-frequency resources on the target beams as required. The target beams may include the service beam presently accessed by the terminal and may also not include the service beam. There are no limits made thereto in the embodiment of the present disclosure. The base station may generate the second resource configuration information according to an allocation result, and send the second resource configuration information to the terminal such that the terminal to receive the data according to the multiple target time-frequency resources of the multiple target beams designed in the second resource configuration information. In some embodiments, the base station may send the beam configuration information to the terminal through RRC signaling, a MAC CE or physical-layer signaling.

There is made such a hypothesis that the second resource configuration information indicates that the base station configures three target beams, i.e., a first target beam, a second target beam and a third target beam respectively, to the terminal. A time-frequency resource for transmission of the first target beam may be a first symbol of a first slot and a second symbol of a second slot, a time-frequency resource for transmission of the second target beam may be a third symbol and fourth symbol of a third slot, and a time-frequency resource for transmission of the third target beam may be a fifth symbol of a fourth slot. The terminal, after receiving the second resource configuration information, acquires a pilot time-frequency position and time-frequency resource of the first target beam, the second target beam and the third target beam according to the beam configuration information, further determine sending time of the first symbol, the second symbol, the third symbol, the fourth symbol and the fifth symbol, and receive the data in the corresponding target beams.

During a practical application, there may be such a condition for the multiple time-frequency resources that the time-frequency resources of different target beams are simultaneously transmitted, and in such case, the terminal may simultaneously recognize different target beams for data reception.

In some embodiments, the terminal, after sending the candidate beam feedback information to the base station, may send the resource configuration request to the base station as required; and the base station, after receiving the resource configuration request, may allocate to the terminal the target beams that may be accessed in the candidate beams indicated in the candidate beam feedback information, and the multiple time-frequency resources for transmission of the target beams; then generate the second resource configuration information according to the allocation result; and send the second resource configuration information to the terminal. For example, if the terminal determines that a large number of data packets are required to be received in a short time, the resource configuration request may be sent to the base station.

Figure 1F:
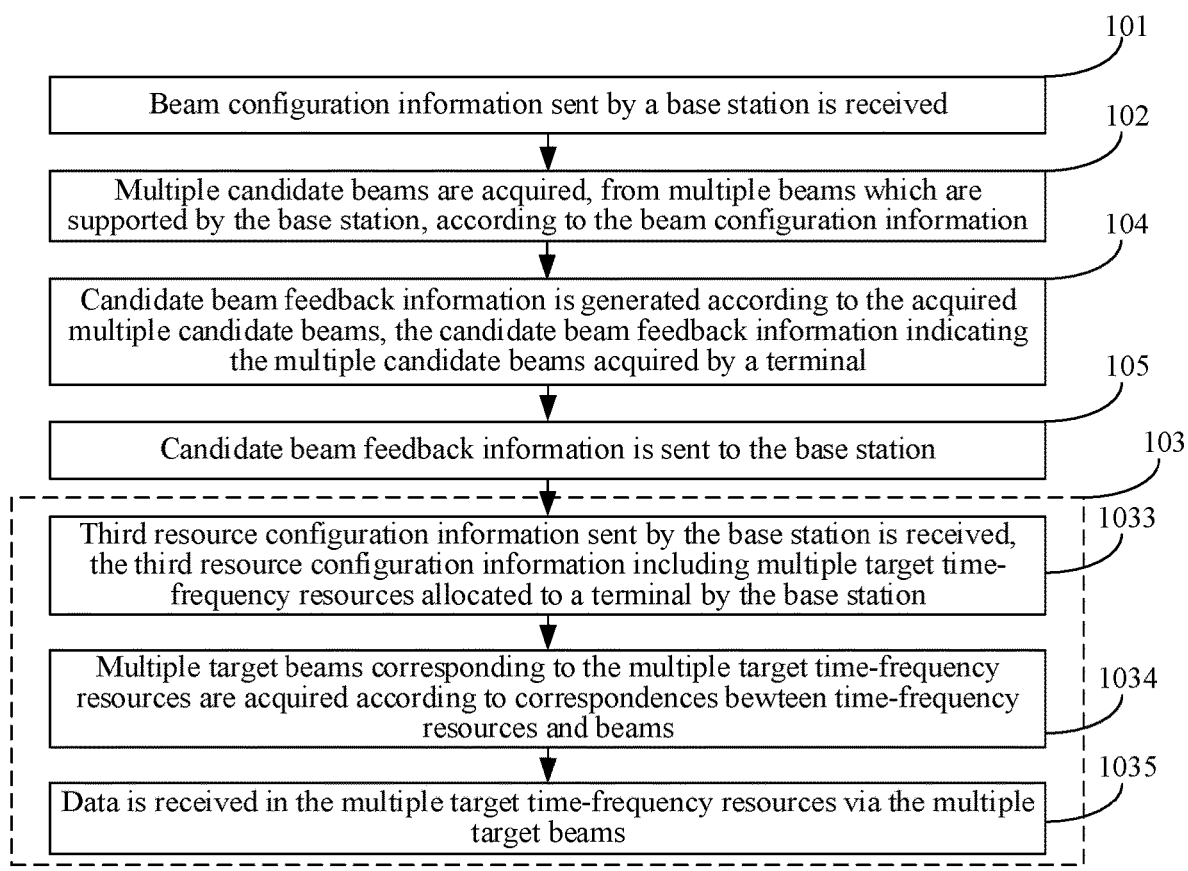
FIG. 1F is a flowchart showing a method for data transmission for a terminal side, according to some embodiments of the present disclosure.

In some embodiments, as shown in FIG. 1F, the operation in Block 103 that the data is received according to the multiple candidate beams may be implemented by Block 1033 to Block 1035.

In Block 1033, third resource configuration information sent by the base station is received, and the third resource configuration information includes multiple target time-frequency resources allocated to the terminal by the base station.

In Block 1034, multiple target beams corresponding to the multiple target time-frequency resources are acquired according to correspondences between time-frequency resources and beams.

In Block 1035, the data is received in the multiple target time-frequency resources via the multiple target beams.

When the terminal accesses a system or after the terminal accesses the system, the base station may send pre-configuration information to the terminal. The pre-configuration information includes the correspondences between the time-frequency resources and the beams, and the correspondences between the time-frequency resources and the beams indicates correspondences between different time-frequency resources and different beams, namely different time-frequency resources correspond to different beams.

The base station, after receiving the candidate beam feedback information sent by the terminal, may allocate to the terminal the multiple target time-frequency resources in the time-frequency resources, indicated in the candidate beam feedback information, for transmission of the multiple candidate beams as required, then generate the third resource configuration information according to an allocation result, and send the third resource configuration information to the terminal.

The terminal, after receiving the third resource configuration information, acquires the multiple target time-frequency resources indicated in the third resource configuration information, then acquires the target beam corresponding to each target time-frequency resource of the multiple target time-frequency resources according to the correspondences between the time-frequency resources and the beams, acquires the pilot time-frequency position and time-frequency resource of each target beam according to the beam configuration information, determine a time sequence of the multiple target time-frequency resources, and sequentially accesses the target beam corresponding to each target time-frequency resource for data reception according to the time.

In the technical solution provided in the embodiment of the present disclosure, the terminal may receive the data on the multiple target time-frequency resources of the multiple target beams configured by the base station, so that the multi-beam data receiving solution is implemented, the probability of packet loss in the process that the base station sends the data to the terminal is reduced, and the data receiving reliability and the data receiving effectiveness are improved.

Various embodiments of the present disclosure can be described below from an aspect of a base station side.

The embodiment of the present disclosure provides a method for data transmission. The data transmission method is applied to a base station. The base station may send beam configuration information to a terminal such that the terminal selects, according to the beam configuration information, multiple candidate beams from multiple beams which are supported by the base station, and receives data according to the multiple candidate beams.

Exemplarily, the base station, when determining unreliable data reception of the terminal or re-access of the terminal to the base station, may send the beam configuration information to the terminal. In some embodiments, the base station may send the beam configuration information through RRC signaling, a MAC CE or physical-layer signaling.

Exemplarily, the base station may determine whether a present data receiving state of the terminal meets a preset condition or not. If the present data receiving state of the terminal does not meet the preset condition, the base station may send the beam configuration information to the terminal such that the terminal selects, according to the beam configuration information, the multiple candidate beams from the multiple beams which are supported by the base station, and receives downlink data according to the multiple candidate beams.

Figure 2A:
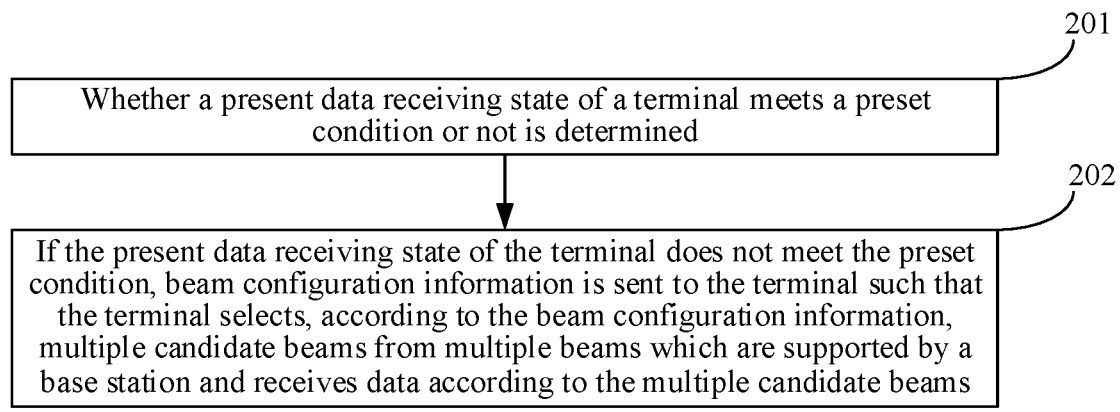
FIG. 2A is a flowchart showing a method for data transmission for a base station side, according to some embodiments of the present disclosure.

FIG. 2A is a flowchart showing a method for data transmission, according to some embodiments of the present disclosure. As shown in FIG. 2A, the method includes the following Block 201 to Block 202.

In Block 201, whether a present data receiving state of a terminal meets a preset condition or not is determined.

In Block 202, if the present data receiving state of the terminal does not meet the preset condition, beam configuration information is sent to the terminal such that the terminal selects, according to the beam configuration information, multiple candidate beams from multiple beams which are supported by the base station, and receives data according to the multiple candidate beams.

Exemplarily, the base station, after the terminal accesses a service beam, may detect whether the number of terminals accessing the service beam is greater than or equal to a preset number threshold value or not in real time. If the number of the terminals accessing the service beam is greater than or equal to the preset number threshold value, there may be such a condition that a time-frequency resource of the service beam is not enough to allocate, which may influence data reception of the terminal. Therefore, when the number of the terminals accessing the service beam is greater than or equal to the preset number threshold value, the base station determines that the present data receiving state of the terminal does not meet the preset condition, and sends the beam configuration information to the terminal to trigger data reception of the terminal on multiple beams.

Or, the base station may also detect whether the number of data packets required to be transmitted to the terminal in a first preset time interval is greater than or equal to a first preset threshold value or not in real time. If the number of the data packets required to be transmitted to the terminal in the first preset time interval is greater than or equal to the first preset threshold value, data reception of the terminal only on the service beam may cause relatively low data receiving efficiency. Therefore, the base station may determine that the present data receiving state of the terminal does not meet the preset condition, and send the beam configuration information to the terminal to trigger data reception of the terminal on the multiple beams.

Or, the terminal, when accessing the service beam for data reception, may determine whether the number of data packets required to be received in a next second preset time interval is greater than or equal to a second preset threshold value or not. If the terminal determines that the number of the data packets required to be received in the next second preset time interval is greater than or equal to the second preset threshold value, data reception only on the service beam may cause relatively low data receiving efficiency. In such case, the terminal may send a resource configuration request to the base station. The base station, if receiving the resource configuration request sent by the terminal, may determine that the present data receiving state of the terminal does not meet the preset condition, and send the beam configuration information to the terminal to trigger data reception of the terminal on the multiple beams.

Or, the base station may determine whether an access request of the terminal is received or not. If the access request sent by the terminal is received, it is indicated that the terminal is just started or the terminal receives data on a beam accessed before unreliably and the terminal is reselecting the service beam for access according to an instruction of a user. In such case, the base station may determine that the present data receiving state of the terminal does not meet the preset condition, and send the beam configuration information to the terminal to trigger data reception of the terminal on the multiple beams.

In the technical solution provided in the embodiment of the present disclosure, the base station may send the beam configuration information to the terminal such that the terminal selects the multiple candidate beams according to the beam configuration information, and further receives, according to the multiple candidate beams, the data sent by the base station, so that a multi-beam data receiving solution is implemented, a probability of packet loss in a process that the base station sends the data to the terminal is reduced, and data receiving reliability and data receiving effectiveness are improved.

Figure 2B:
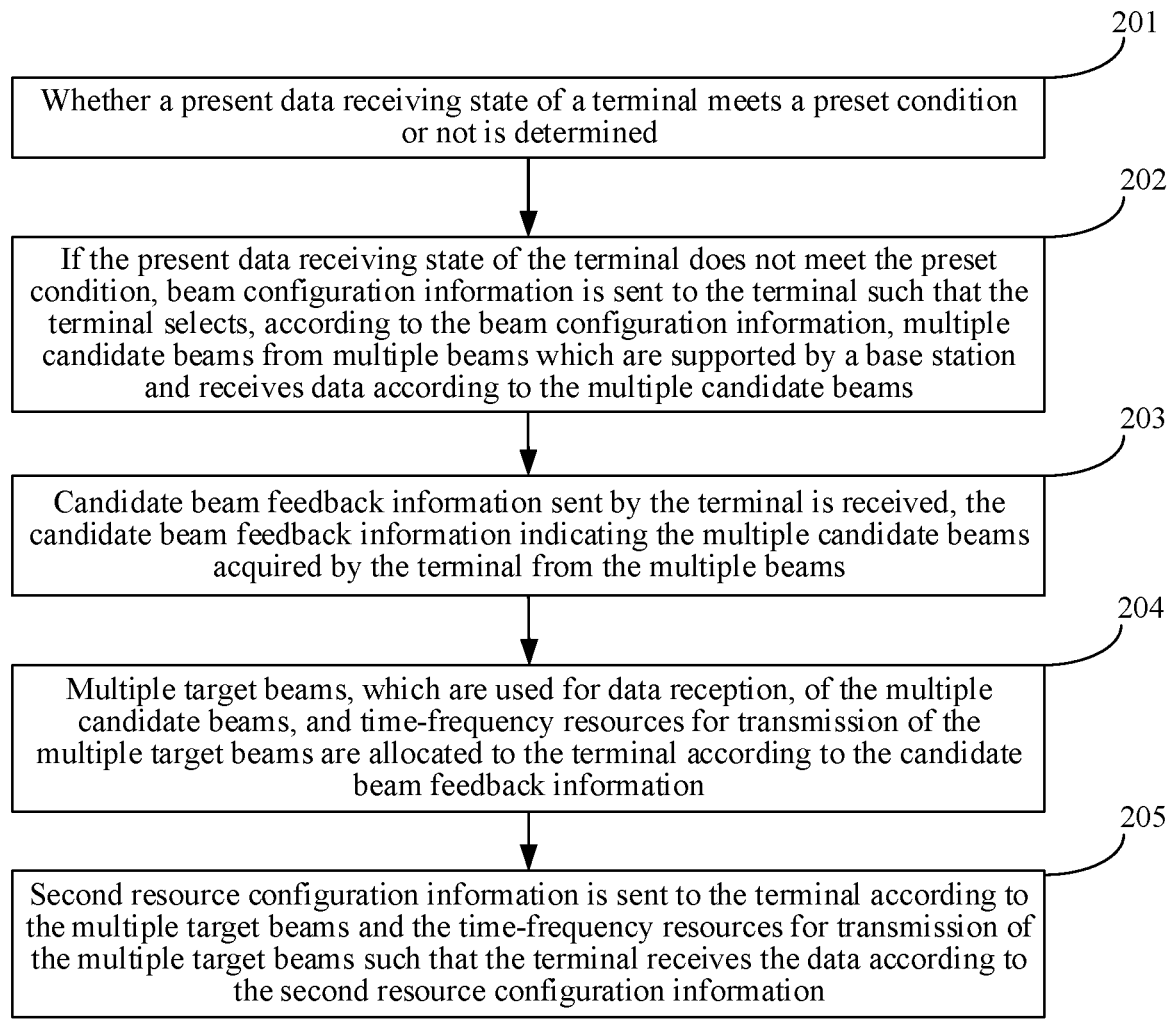
FIG. 2B is a flowchart showing a method for data transmission for a base station side, according to some embodiments of the present disclosure.

In some embodiments, as shown in FIG. 2B, the method further includes Block 203 to Block 205.

In Block 203, candidate beam feedback information sent by the terminal is received, and the candidate beam feedback information indicates the multiple candidate beams acquired by the terminal from the multiple beams.

In Block 204, multiple target beams, which are used for data reception, of the multiple candidate beams, and time-frequency resources for transmission of the multiple target beams are allocated to the terminal according to the candidate beam feedback information.

In Block 205, second resource configuration information is sent to the terminal according to the multiple target beams and the time-frequency resources for transmission of the multiple target beams such that the terminal receives the data according to the second resource configuration information.

Exemplarily, the base station may receive the candidate beam feedback information sent by the terminal via a preset time-frequency resource; then allocate, according to a preset first resource configuration strategy, to the terminal the target beams that may be accessed in the multiple candidate beams indicated in the candidate beam feedback information, and the multiple time-frequency resources for transmission of the target beams; generate the second resource configuration information according to an allocation result; and send the second resource configuration information to the terminal, such that the terminal receives the data according to the multiple target beams and multiple time-frequency resources for transmission of the multiple target beams indicated in the second resource configuration information. In some embodiments, the target beams may include the service beam presently accessed by the terminal and may also not include the service beam. There are no limits made thereto in the embodiment of the present disclosure.

Exemplarily, the first resource configuration strategy may be selecting, according to the number of terminals accessing each beam, the candidate beams that are accessed by relatively small numbers of terminals as the target beams; then according to the number of data packets transmitted on each target beam, allocating relatively more time-frequency resources to the terminal on the target beam where a relatively small number of data packets are transmitted; and allocating relatively few time-frequency resources to the terminal on the target beam where a relatively large number of data packets are transmitted.

In some embodiments, the base station may also send first resource configuration information to the base station at first, and then receive the candidate beam feedback information sent by the terminal with a time-frequency resource indicated in the first resource configuration information.

Figure 2C:
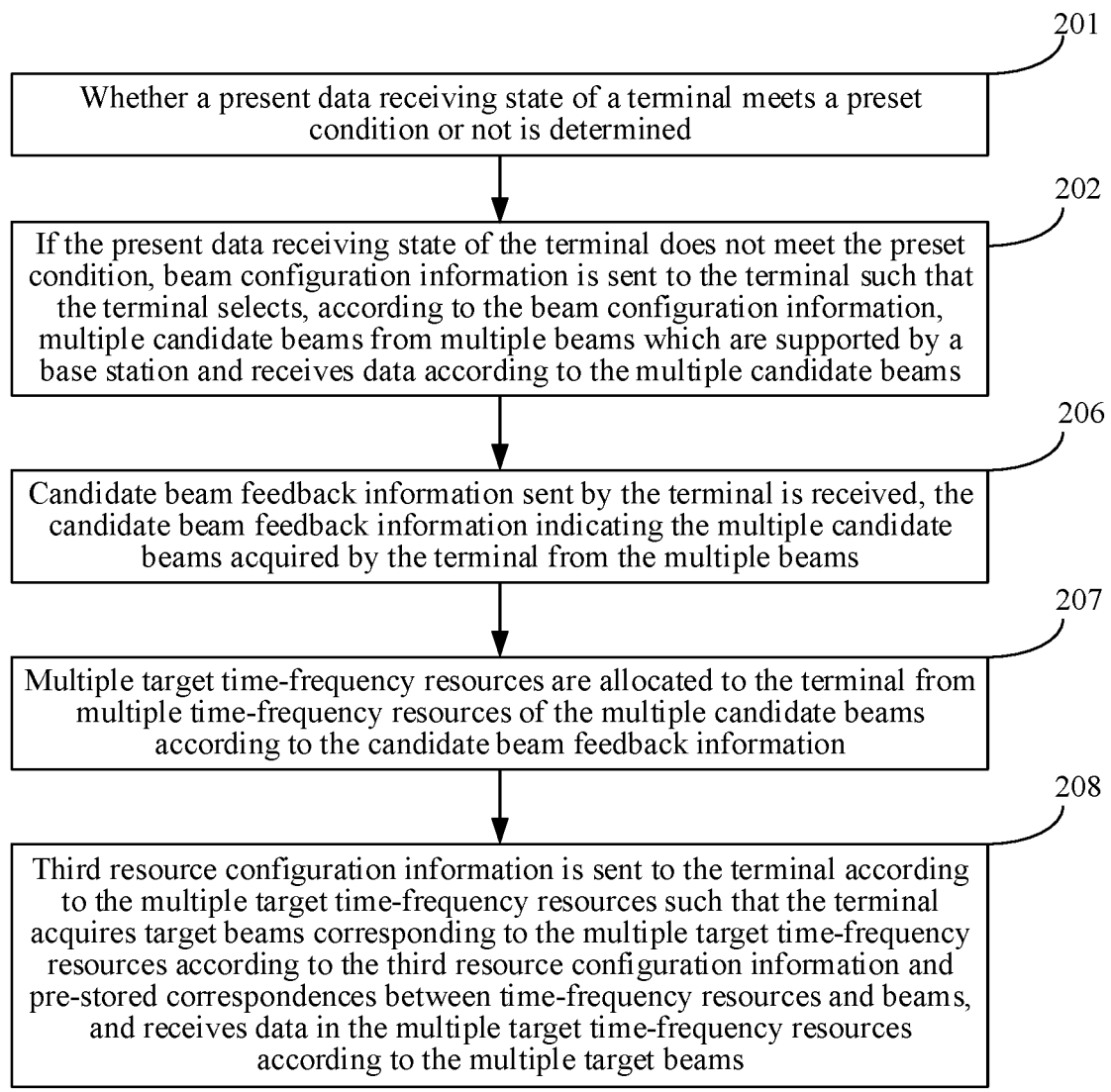
FIG. 2C is a flowchart showing a method for data transmission for a base station side, according to some embodiments of the present disclosure.

In some embodiments, as shown in FIG. 2C, the method further includes Block 206 to Block 208.

In Block 206, the candidate beam feedback information sent by the terminal is received, and the candidate beam feedback information indicates the multiple candidate beams acquired by the terminal from the multiple beams.

In Block 207, multiple target time-frequency resources are allocated to the terminal from multiple time-frequency resources of the multiple candidate beams according to the candidate beam feedback information.

In Block 208, third resource configuration information is sent to the terminal according to the multiple target time-frequency resources such that the terminal acquires target beams corresponding to the multiple target time-frequency resources according to the third resource configuration information and pre-stored correspondences between time-frequency resources and beams, and receives the data in the multiple target time-frequency resources according to the multiple target beams.

During initialization, the base station may send pre-configuration information to the terminal. The pre-configuration information includes correspondences between time-frequency resources and beams, and the correspondences between the time-frequency resources and the beams indicates correspondences between different time-frequency resources and different beams, namely different time-frequency resources correspond to different beams.

The base station, after receiving the candidate beam feedback information sent by the terminal, may allocate, according to a preset second resource configuration strategy, to the terminal the multiple target time-frequency resources of the multiple time-frequency resources, indicated in the candidate beam feedback information, for transmission of the multiple candidate beams; then generate the third resource configuration information according to an allocation result; and send the third resource configuration information to the terminal. The second resource configuration strategy may be integrating multiple idle time-frequency resources of the multiple candidate beams and then randomly selecting M time-frequency resources of the multiple idle time-frequency resources as the target time-frequency resources designed to the terminal, M may be an integer greater than or equal to 1.

In the technical solution provided in the embodiment of the present disclosure, the base station may allocate the multiple target time-frequency resources of the multiple target beams to the terminal such that the terminal selects the multiple candidate beams and receives the data sent by the base station according to the multiple candidate beams, so that the multi-beam data receiving solution is implemented, the probability of packet loss in the process that the base station sends the data to the terminal is reduced, and the data receiving reliability and the data receiving effectiveness are improved.

Various technical solutions in the embodiments will be indicated below through specific embodiments.

A first embodiment can be described as follows.

Figure 3:
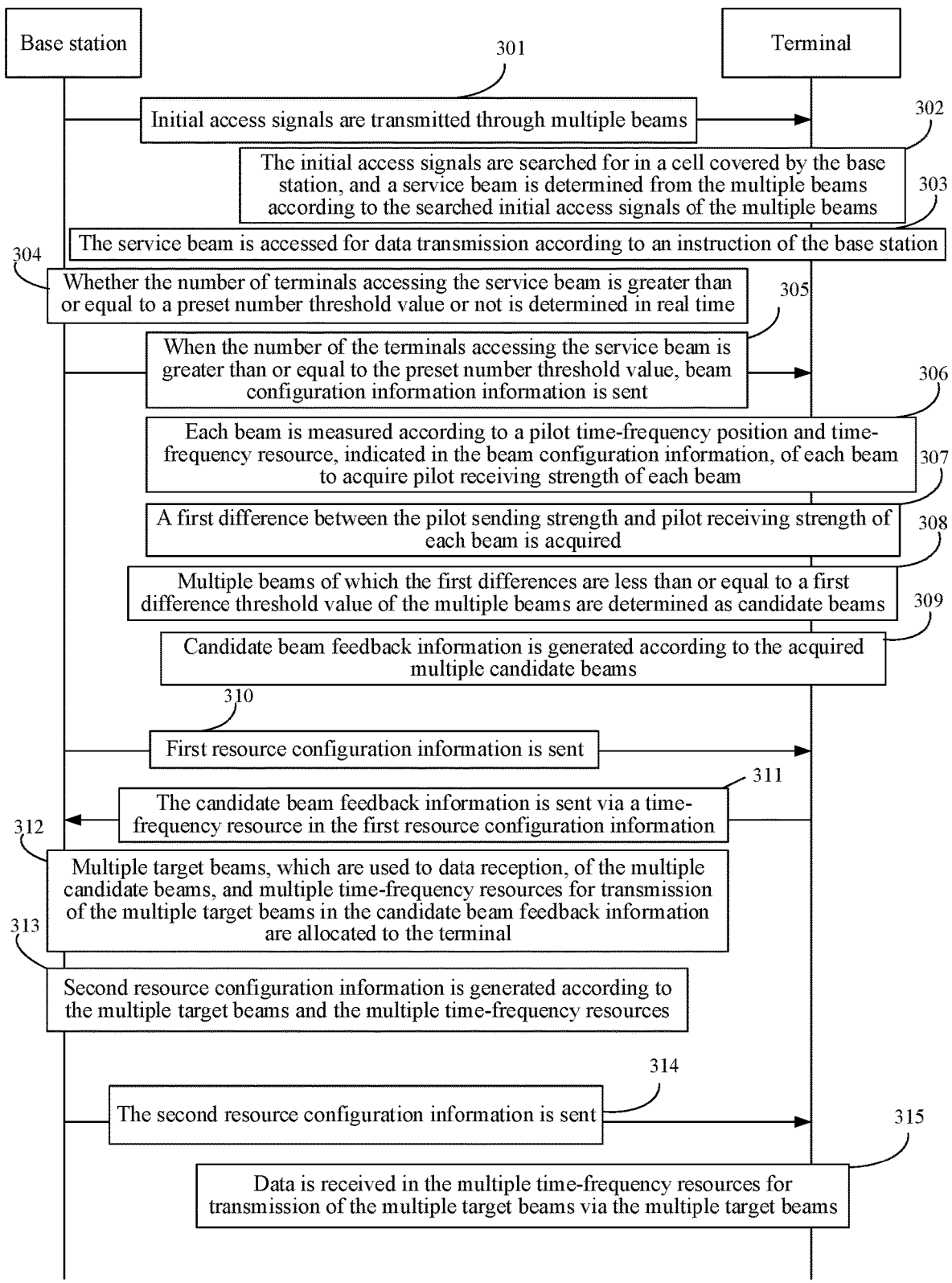
FIG. 3 is an interaction diagram of a method for data transmission, according to some embodiments of the present disclosure.

FIG. 3 is an interaction diagram of a method for data transmission, according to some embodiments of the present disclosure. As shown in FIG. 3, the method includes the following Block 301 to Block 315.

In Block 301, a base station transmits initial access signals through multiple beams.

In Block 302, a terminal searches for the initial access signals in a cell covered by the base station, and determines a service beam from the multiple beams according to the searched initial access signals of the multiple beams.

In Block 303, the terminal accesses the service beam for data transmission according to an instruction of the base station.

In Block 304, the base station determines whether the number of terminals accessing the service beam is greater than or equal to a preset number threshold value or not in real time.

In Block 305, when the number of the terminals accessing the service beam is greater than or equal to the preset number threshold value, the base station sends beam configuration information to the terminal.

The beam configuration information includes pilot configuration information and beam transmission information of the multiple beams. The pilot configuration information indicates a pilot configuration of each of the multiple beams which are supported by the base station, and the beam transmission information indicates a time-frequency resource for transmission of each of the multiple beams.

In Block 306, the terminal measures each beam according to the pilot time-frequency position and time-frequency resource, indicated in the beam configuration information, of each beam to acquire pilot receiving strength of each beam.

In Block 307, the terminal acquires a first difference between the pilot sending strength and pilot receiving strength of each beam.

In Block 308, the terminal determines multiple beams of which the first differences are less than or equal to a first difference threshold value of the multiple beams as candidate beams.

In Block 309, the terminal generates candidate beam feedback information according to the acquired multiple candidate beams.

In Block 310, the base station sends first resource configuration information to the terminal.

The first resource configuration information includes a time-frequency resource which is designed by the base station and is used to send the candidate beam feedback information.

In Block 311, the terminal sends the candidate beam feedback information to the base station via the time-frequency resource in the first resource configuration information.

In Block 312, the base station allocates to the terminal multiple target beams, which are used for data reception, of the multiple candidate beams and multiple time-frequency resources for transmission of the multiple target beams in the candidate beam feedback information.

In Block 313, the base station generates second resource configuration information according to the multiple target beams and the multiple time-frequency resources.

In Block 314, the base station sends the second resource configuration information to the terminal.

In Block 315, the terminal receives data in the multiple time-frequency resources for transmission of the multiple target beams via the multiple target beams.

According to the method for data transmission provided in the embodiment of the present disclosure, the base station may send the beam configuration information to the terminal, and then the terminal may select, according to the beam configuration information, the multiple candidate beams from the multiple beams which are supported by the base station, and further receive the data according to the multiple candidate beams, so that a multi-beam data receiving solution is implemented, a probability of packet loss in a data receiving process is reduced, and data receiving reliability is improved.

A second embodiment can be described as follows.

Figure 4:
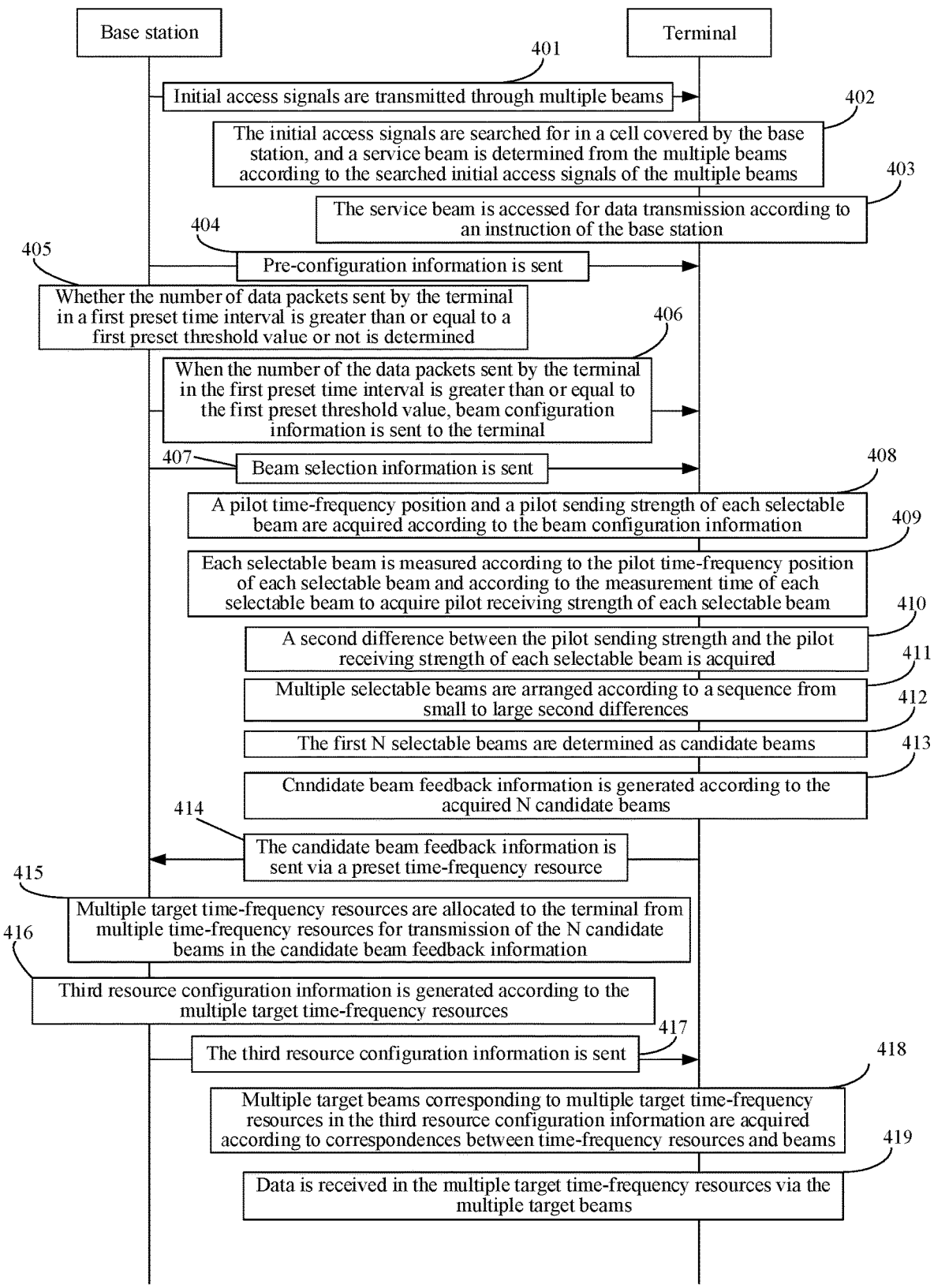
FIG. 4 is an interaction diagram of a method for data transmission, according to some embodiments of the present disclosure.

FIG. 4 is an interaction diagram of a method for data transmission, according to some embodiments of the present disclosure. As shown in FIG. 4, the method includes the following Block 401 to Block 419.

In Block 401, a base station transmits initial access signals through multiple beams.

In Block 402, a terminal searches for the initial access signals in a cell covered by the base station and determines a service beam from the multiple beams according to the searched initial access signals of the multiple beams.

In Block 403, the terminal accesses the service beam for data transmission according to an instruction of the base station.

In Block 404, the base station sends pre-configuration information to the terminal.

The pre-configuration information includes correspondences between time-frequency resources and beams.

In Block 405, the base station determines whether the number of data packets sent by the terminal in a first preset time interval is greater than or equal to a first preset threshold value or not.

In Block 406, when the number of the data packets sent by the terminal in the first preset time interval is greater than or equal to the first preset threshold value, the base station sends beam configuration information to the terminal.

The beam configuration information includes pilot configuration information and beam transmission information of the multiple beams. The pilot configuration information indicates a pilot configuration of each of the multiple beams which are supported by the base station, and the beam transmission information indicates a time-frequency resource for transmission of each of the multiple beams.

In Block 407, the base station sends beam selection information to the terminal.

The beam selection information indicates multiple selectable beams designed to the terminal by the base station from the multiple beams, and indicates measurement time of each selectable beam of the multiple selectable beams.

In Block 408, the terminal acquires the pilot time-frequency position and pilot sending strength of each selectable beam according to the beam configuration information.

In Block 409, the terminal measures each selectable beam according to the pilot time-frequency position of the selectable beam and according to the measurement time of each selectable beam to acquire pilot receiving strength of the selectable beam.

In Block 410, the terminal acquires a second difference between the pilot sending strength and pilot receiving strength of each selectable beam.

In Block 411, the terminal arranges the multiple selectable beams according to a sequence from small to large second differences.

In Block 412, the terminal acquires the first N selectable beams as candidate beams.

In Block 413, the terminal generates candidate beam feedback information according to the acquired N candidate beams.

In Block 414, the terminal sends the candidate beam feedback information to the base station via a preset time-frequency resource.

In Block 415, the base station allocates to the terminal multiple target time-frequency resources from multiple time-frequency resources for transmission of the N candidate beams in the candidate beam feedback information.

In Block 416, the base station generates third resource configuration information according to the multiple target time-frequency resources.

In Block 417, the base station sends the third resource configuration information to the terminal.

In Block 418, the terminal acquires the multiple target beams corresponding to the multiple target time-frequency resources in the third resource configuration information according to correspondences between time-frequency resources and beams.

In Block 419, the terminal receives data in the multiple target time-frequency resources via the multiple target beams.

According to the method for data transmission provided in the embodiment of the present disclosure, the base station may send the beam configuration information to the terminal; and then the terminal may select, according to the beam configuration information, the multiple candidate beams from the multiple beams which are supported by the base station, and further receive the data according to the multiple candidate beams, so that a multi-beam data receiving solution is implemented, a probability of packet loss in a data receiving process is reduced, and data receiving reliability is improved.

The below is a device embodiment of the present disclosure, which may be configured to execute the method embodiment of the present disclosure.

Figure 5A:
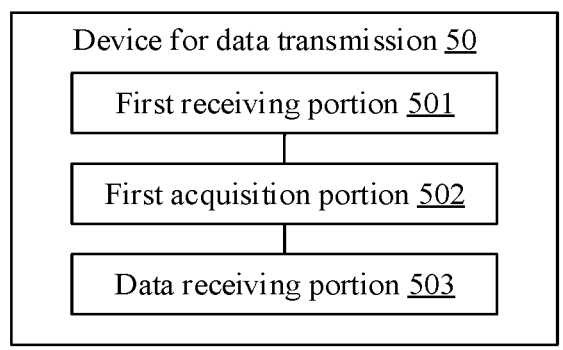
FIG. 5A is a structure diagram of a device for data transmission, according to some embodiments of the present disclosure.

FIG. 5A is a block diagram of a device 50 for data transmission, according to some embodiments of the present disclosure. The device 50 may be implemented into part or all of an electronic device through software, hardware or a combination of the two. As shown in FIG. 5A, the device 50 for data transmission includes a first receiving portion 501, a first acquisition portion 502 and a data receiving portion 503.

The first receiving portion 501 is configured to receive beam configuration information sent by a base station;

The first acquisition portion 502 is configured to acquire, according to the beam configuration information, multiple candidate beams from multiple beams which are supported by the base station.

The data receiving portion 503 is configured to receive data according to the multiple candidate beams.

In some embodiments, the beam configuration information includes pilot configuration information and beam transmission information of the multiple beams. The pilot configuration information indicates a pilot configuration of each of the multiple beams which are supported by the base station, and the beam transmission information indicates a time-frequency resource for transmission of each of the multiple beams.

Figure 5B:
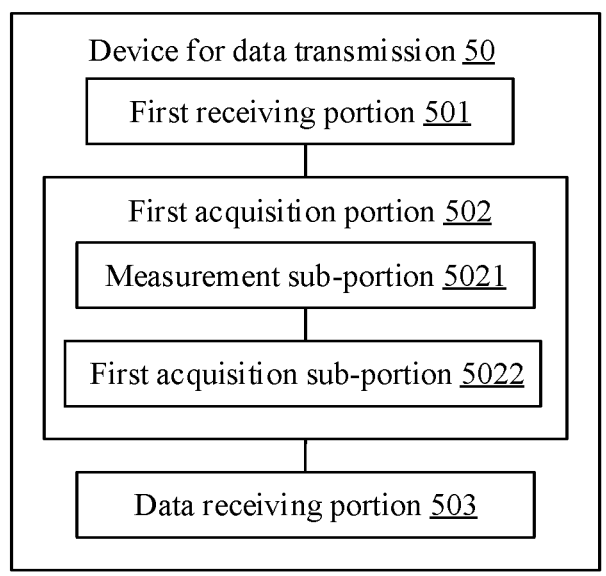
FIG. 5B is a structure diagram of a device for data transmission, according to some embodiments of the present disclosure.

In some embodiments, the pilot configuration information includes a pilot time-frequency position and pilot sending strength, and as shown in FIG. 5B, the first acquisition portion 502 includes a measurement sub-portion 5021 and a first acquisition sub-portion 5022.

The measurement sub-portion 5021 is configured to measure, according to the pilot time-frequency position of each of the multiple beams, the beams to acquire a pilot measurement result of the beam.

The first acquisition sub-portion 5022 is configured to acquire the multiple candidate beams from the multiple beams according to the pilot measurement result of each beam.

Figure 5C:
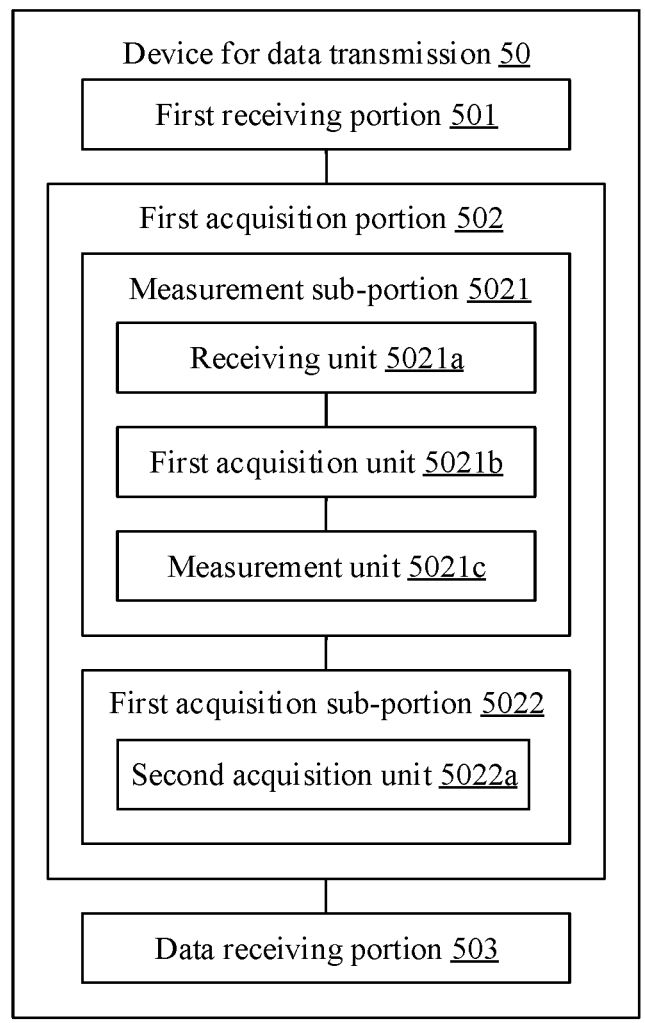
FIG. 5C is a structure diagram of a device for data transmission, according to some embodiments of the present disclosure.

In some embodiments, as shown in FIG. 5C, the measurement sub-portion 5021 includes a receiving unit 5021a, a first acquisition unit 5021b and a measurement unit 5021c, and the first acquisition sub-portion 5022 includes a second acquisition unit 5022a.

The receiving unit 5021a is configured to receive beam selection information sent by the base station. The beam selection information indicates multiple selectable beams, which are designed to the terminal by the base station, of the multiple beams, and indicates measurement time of each selectable beam in the multiple selectable beams.

The first acquisition unit 5021b is configured to acquire the pilot time-frequency position and pilot sending strength of each selectable beam according to the beam configuration information.

The measurement unit 5021c is configured to measure, according to the pilot time-frequency position of each selectable beam and according to the measurement time of each selectable beam, each selectable beam to acquire the pilot measurement result of each selectable beam.

The second acquisition unit 5022a is configured to acquire the multiple candidate beams from the multiple selectable beams according to the pilot measurement result of each selectable beam.

Figure 5D:
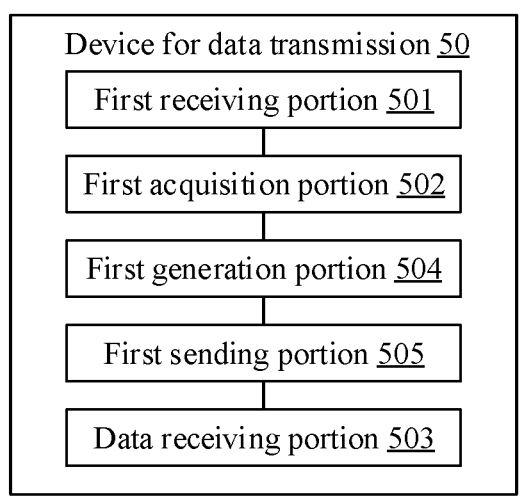
FIG. 5D is a structure diagram of a device for data transmission, according to some embodiments of the present disclosure.

In some embodiments, as shown in FIG. 5D, the device 50 further includes a first generation portion 504 and a first sending portion 505.

The first generation portion 504 is configured to generate candidate beam feedback information according to the acquired multiple candidate beams. The candidate beam feedback information indicates the multiple candidate beams acquired by the terminal.

The first sending portion 505 is configured to send the candidate beam feedback information to the base station.

Figure 5E:
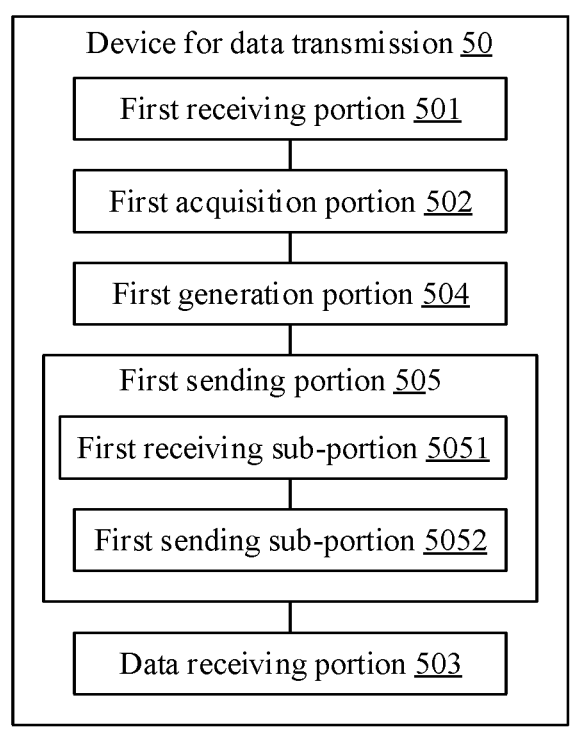
FIG. 5E is a structure diagram of a device for data transmission, according to some embodiments of the present disclosure.

In some embodiments, as shown in FIG. 5E, the first sending portion 505 includes a first receiving sub-portion 5051 and a first sending sub-portion 5052.

The first receiving sub-portion 5051 is configured to receive first resource configuration information sent by the base station. The first resource configuration information includes a time-frequency resource which is designed by the base station and is used to send the candidate beam feedback information.

The first sending sub-portion 5052 is configured to send the candidate beam feedback information to the base station via the time-frequency resource in the first resource configuration information.

Figure 5F:
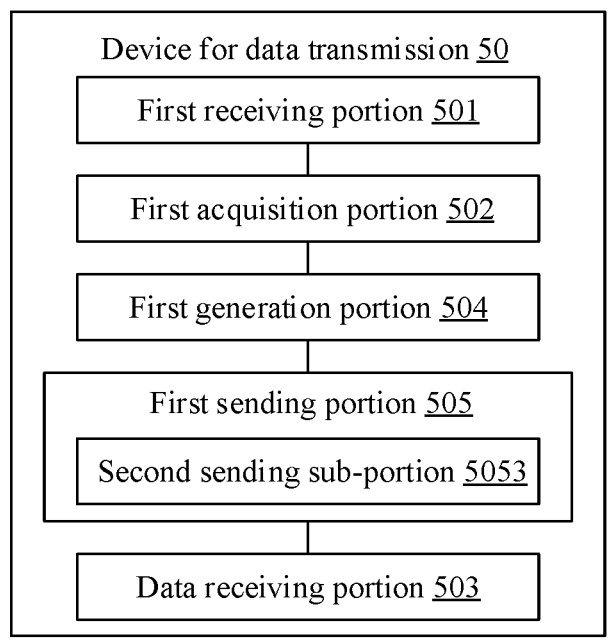
FIG. 5F is a structure diagram of a device for data transmission, according to some embodiments of the present disclosure.

In some embodiments, as shown in FIG. 5F, the first sending portion 505 includes a second sending sub-portion 5053, and the second sending sub-portion 5053 is configured to send the candidate beam feedback information to the base station via a preset time-frequency resource.

Figure 5G:
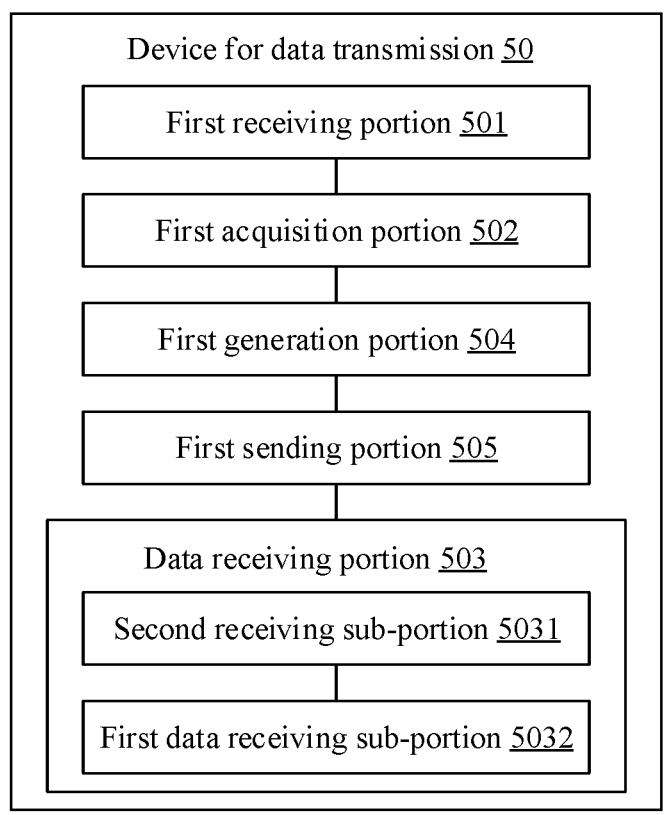
FIG. 5G is a structure diagram of a device for data transmission, according to some embodiments of the present disclosure.

In some embodiments, as shown in FIG. 5G, the data receiving portion 503 includes a second receiving sub-portion 5031 and a first data receiving sub-portion 5032.

The second receiving sub-portion 5031 is configured to receive second resource configuration information sent by the base station. The second resource configuration information includes multiple target beams, which are allocated to the terminal by the base station for data reception, of the multiple candidate beams, and includes the time-frequency resources for transmission of the multiple target beams.

The first data receiving sub-portion 5032 is configured to receive the data in the time-frequency resources for transmission of the multiple target beams via the multiple target beams.

Figure 5H:
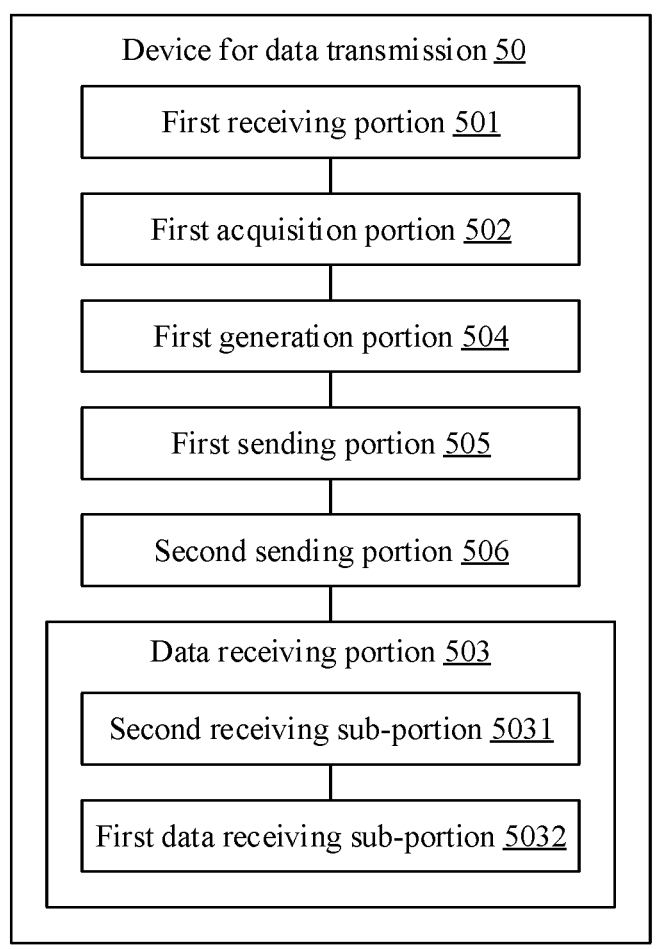
FIG. 5H is a structure diagram of a device for data transmission, according to some embodiments of the present disclosure.

In some embodiments, as shown in FIG. 5H, the device 50 further includes a second sending portion 506, and the second sending portion 506 is configured to send a resource configuration request to the base station such that the base station sends the second resource configuration information to the terminal according to the resource configuration request.

Figure 5I:
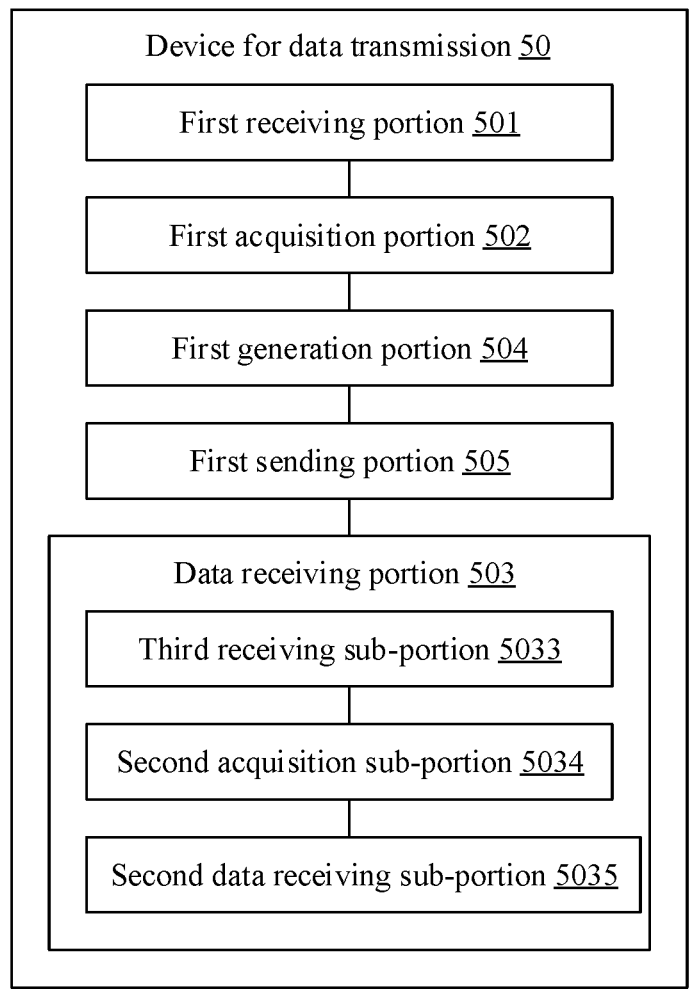
FIG. 5I is a structure diagram of a device for data transmission, according to some embodiments of the present disclosure.

In some embodiments, as shown in FIG. 5I, the data receiving portion 503 includes a third receiving sub-portion 5033, a second acquisition sub-portion 5034 and a second data receiving sub-portion 5035.

The third receiving sub-portion 5033 is configured to receive third resource configuration information sent by the base station. The third resource configuration information includes multiple target time-frequency resources allocated to the terminal by the base station.

The second acquisition sub-portion 5034 is configured to acquire multiple target beams corresponding to the multiple target time-frequency resources according to correspondences between time-frequency resources and beams. The correspondences between the time-frequency resources and the beams indicates correspondences between different time-frequency resources and different beams.

The second data receiving sub-portion 5035 is configured to receive the data in the multiple target time-frequency resources via the multiple target beams.

Figure 5J:
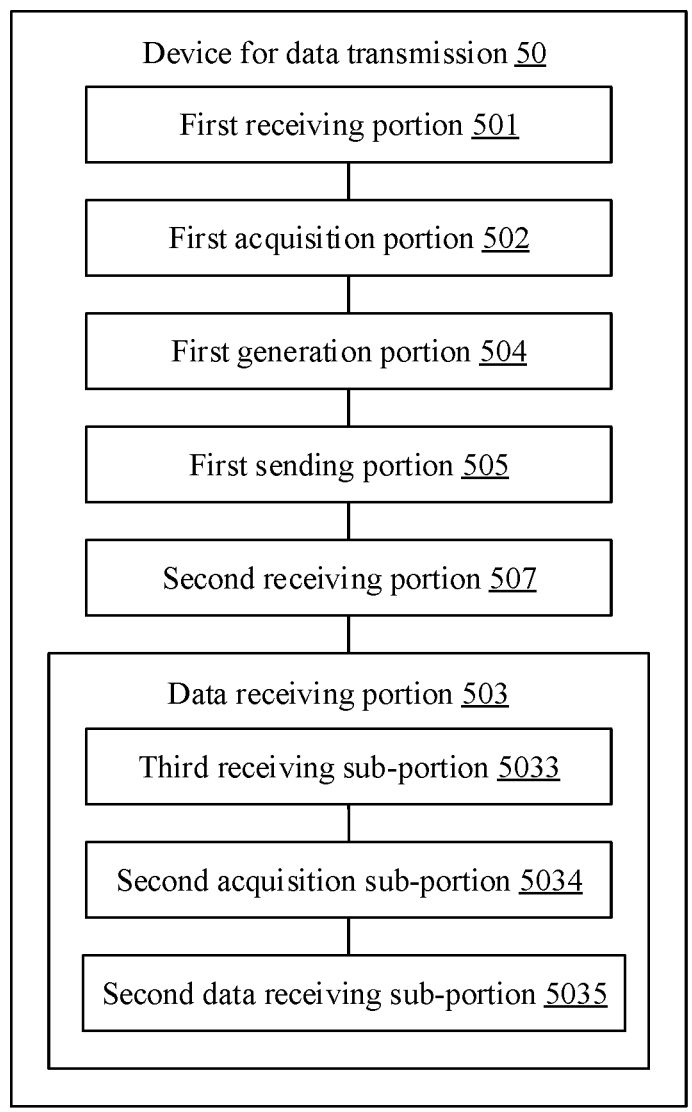
FIG. 5J is a structure diagram of a device for data transmission, according to some embodiments of the present disclosure.

In some embodiments, as shown in FIG. 5J, the device 50 further includes a second receiving portion 507.

The second receiving portion 507 is configured to receive pre-configuration information sent by the base station. The pre-configuration information includes the correspondences between the time-frequency resources and the beams.

According to the device for data transmission provided in the embodiment of the present disclosure, the device may acquire, according to the beam configuration information sent by the base station, the multiple candidate beams from the multiple beams which are supported by the base station; and further receive the data sent by the base station according to the multiple candidate beams, so that a multi-beam data receiving solution is implemented, a probability of packet loss in a process that the base station sends the data to the terminal is reduced, and data receiving reliability and data receiving effectiveness are improved.

FIG. 6A is a block diagram of a device for data transmission 60, according to some embodiments of the present disclosure. The device 60 may be implemented into part or all of an electronic device through software, hardware or a combination of the two. As shown in FIG. 6A, the device 60 for data transmission includes a third sending portion 602.

The third sending portion 602 is configured to send beam configuration information to a terminal such that the terminal selects, according to the beam configuration information, multiple candidate beams from multiple beams which are supported by the base station, and receives data according to the multiple candidate beams.

Figure 6B:
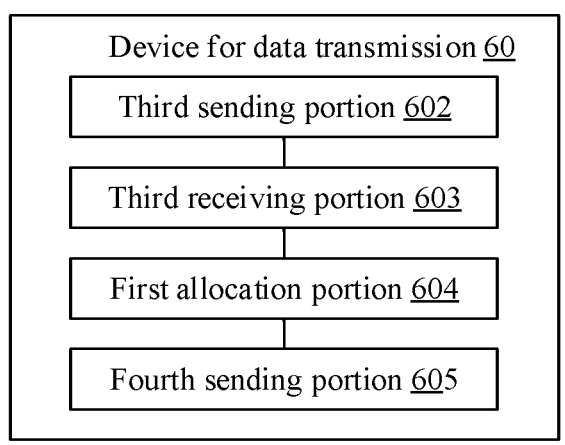
FIG. 6B is a structure diagram of a device for data transmission, according to some embodiments of the present disclosure.

In some embodiments, as shown in FIG. 6B, the device 60 further includes a third receiving portion 603, a first allocation portion 604 and a fourth sending portion 605.

The third receiving portion 603 is configured to receive candidate beam feedback information sent by the terminal. The candidate beam feedback information indicates the multiple candidate beams acquired by the terminal from the multiple beams.

The first allocation portion 604 is configured to allocate, according to the candidate beam feedback information, to the terminal multiple target beams, which are used for data reception, of the multiple candidate beams, and to the terminal time-frequency resources for transmission of the multiple target beams.

The fourth sending portion 605 is configured to send second resource configuration information to the terminal according to the multiple target beams and the time-frequency resources for transmission of the target beams such that the terminal receives the data according to the second resource configuration information.

Figure 6C:
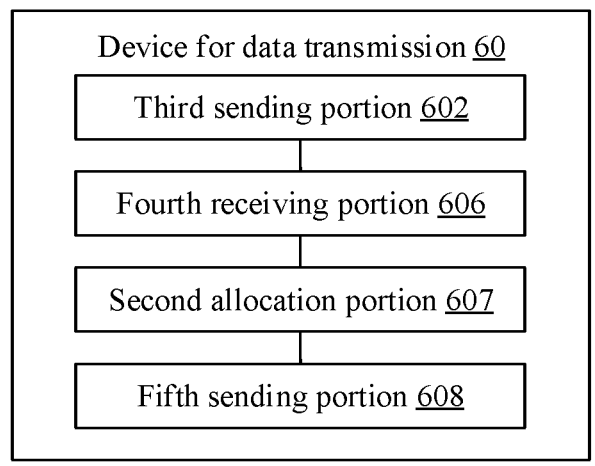
FIG. 6C is a structure diagram of a device for data transmission, according to some embodiments of the present disclosure.

In some embodiments, as shown in FIG. 6C, the device 60 further includes a fourth receiving portion 606, a second allocation portion 607 and a fifth sending portion 608.

The fourth receiving portion 606 is configured to receive the candidate beam feedback information sent by the terminal. The candidate beam feedback information indicates the multiple candidate beams acquired by the terminal from the multiple beams.

The second allocation portion 607 is configured to allocate multiple target time-frequency resources from multiple time-frequency resources of the multiple candidate beams to the terminal according to the candidate beam feedback information.

The fifth sending portion 608 is configured to send third resource configuration information to the terminal according to the multiple target time-frequency resources, such that the terminal acquires, according to the third resource configuration information and pre-stored correspondences between time-frequency resources and beams, target beams corresponding to the multiple target time-frequency resources, and receives the data in the multiple target time-frequency resources according to the multiple target beams.

Figure 6D:
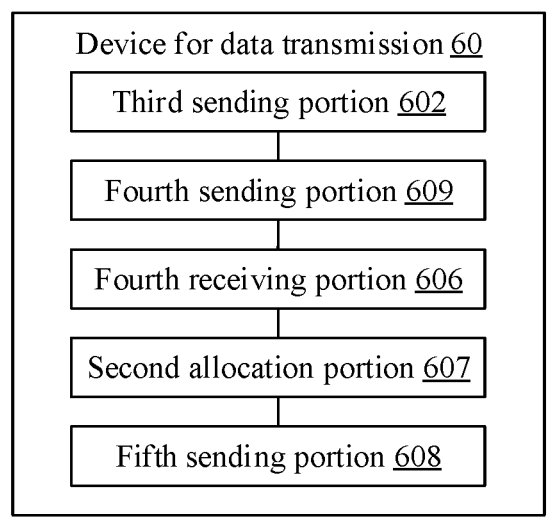
FIG. 6D is a structure diagram of a device for data transmission, according to some embodiments of the present disclosure.

In some embodiments, as shown in FIG. 6D, the device 60 further includes a sixth sending portion 609.

The sixth sending portion 609 is configured to send pre-configuration information to the terminal. The pre-configuration information includes the correspondences between the time-frequency resources and the beams.

According to the device for data transmission provided in the embodiment of the present disclosure, the device may send the beam configuration information to the terminal such that the terminal selects the multiple candidate beams according to the beam configuration information, and further receives, according to the multiple candidate beams, the data sent by the base station, so that a multi-beam data receiving solution is implemented, a probability of packet loss in a process that the base station sends the data to the terminal is reduced, and data receiving reliability and data receiving effectiveness are improved.

An embodiment of the present disclosure also provides a device for data transmission, which includes:

a first processor; and a first memory configured to store an instruction executable for the first processor, wherein the first processor is configured to:

receive beam configuration information sent by a base station;

acquire, according to the beam configuration information, multiple candidate beams from multiple beams which are supported by the base station; and receive data according to the multiple candidate beams.

In some embodiments, the beam configuration information includes pilot configuration information and beam transmission information of the multiple beams. The pilot configuration information indicates a pilot configuration of each of the multiple beams which are supported by the base station, and the beam transmission information indicates a time-frequency resource for transmission of each of the multiple beams.

In some embodiments, the pilot configuration information includes a pilot time-frequency position and pilot sending strength, and the first processor may further be configured to measure, according to the pilot time-frequency position of each of the multiple beams, the beam to acquire a pilot measurement result of the beam, and acquire the multiple candidate beams from the multiple beams according to the pilot measurement result of each beam.

In some embodiments, the first processor may further be configured to: receive beam selection information sent by the base station, herein the beam selection information indicates multiple selectable beams, which are designed to the terminal by the base station, of the multiple beams and indicates measurement time of each of the multiple selectable beams; acquire the pilot time-frequency position and pilot sending strength of each selectable beam according to the beam configuration information; measure, according to the pilot time-frequency position of each selectable beam and according to the measurement time of each selectable beam, the selectable beam to acquire the pilot measurement result of the selectable beam; and acquire the multiple candidate beams from the multiple selectable beams according to the pilot measurement result of each selectable beam.

In some embodiments, the first processor may further be configured to: generate candidate beam feedback information according to the acquired multiple candidate beams, herein the candidate beam feedback information indicates the multiple candidate beams acquired by the terminal; and send the candidate beam feedback information to the base station.

In some embodiments, the first processor may further be configured to receive: first resource configuration information sent by the base station, herein the first resource configuration information includes a time-frequency resource which is designed by the base station and is used to send the candidate beam feedback information; and send the candidate beam feedback information to the base station via the time-frequency resource in the first resource configuration information.

In some embodiments, the first processor may further be configured to send the candidate beam feedback information to the base station via a preset time-frequency resource.

In some embodiments, the first processor may further be configured to: receive second resource configuration information sent by the base station, herein the second resource configuration information includes multiple target beams, which are allocated to the terminal by the base station for data reception, of the multiple candidate beams, and includes the time-frequency resources for transmission of the multiple target beams; and receive the data in the time-frequency resources for transmission of the multiple target beams via the multiple target beams.

In some embodiments, the first processor may further be configured to send a resource configuration request to the base station such that the base station sends the second resource configuration information to the terminal according to the resource configuration request.

In some embodiments, the first processor may further be configured to: receive third resource configuration information sent by the base station, herein the third resource configuration information includes multiple target time-frequency resources allocated to the terminal by the base station; acquire multiple target beams corresponding to the multiple target time-frequency resources according to correspondences between time-frequency resources and beams, herein the correspondences between the time-frequency resources and the beams indicates correspondences between different time-frequency resources and different beams; and receive the data in the multiple target time-frequency resources via the multiple target beams.

In some embodiments, the first processor may further be configured to receive pre-configuration information sent by the base station. The pre-configuration information includes the correspondences between the time-frequency resources and the beams.

According to the device for data transmission provided in the embodiment of the present disclosure, the device may acquire, according to the beam configuration information sent by the base station, the multiple candidate beams from the multiple beams which are supported by the base station; and further receive the data sent by the base station according to the multiple candidate beams, so that a multi-beam data receiving solution is implemented, a probability of packet loss in a process that the base station sends the data to the terminal is reduced, and data receiving reliability and data receiving effectiveness are improved.

Some embodiments of the present disclosure also provide a device for data transmission, which includes:

a second processor; and a second memory configured to store an instruction executable for the second processor, wherein the second processor is configured to:

send beam configuration information to a terminal such that the terminal selects, according to the beam configuration information, multiple candidate beams from multiple beams which are supported by the base station, and receives data according to the multiple candidate beams.

In some embodiments, the second processor may further be configured to:

receive candidate beam feedback information sent by the terminal, herein the candidate beam feedback information indicates the multiple candidate beams acquired by the terminal in the multiple beams; allocate, according to the candidate beam feedback information, to the terminal multiple target beams, which are used for data reception, of the multiple candidate beams, and to the terminal time-frequency resources for transmission of the multiple target beams; and send second resource configuration information to the terminal according to the multiple target beams and the time-frequency resources for transmission of the target beams such that the terminal receives the data according to the second resource configuration information.

In some embodiments, the second processor may further be configured to:

receive the candidate beam feedback information sent by the terminal, herein the candidate beam feedback information indicates the multiple candidate beams acquired by the terminal from the multiple beams; allocate multiple target time-frequency resources from multiple time-frequency resources for the multiple candidate beams to the terminal according to the candidate beam feedback information; and send third resource configuration information to the terminal according to the multiple target time-frequency resources, such that the terminal acquires target beams corresponding to the multiple target time-frequency resources according to the third resource configuration information and a pre-stored correspondences between time-frequency resources and beams, and receives the data in the multiple target time-frequency resources according to the multiple target beams.

In some embodiments, the second processor may further be configured to send pre-configuration information to the terminal. The pre-configuration information includes the correspondences between the time-frequency resources and the beams.

According to the for data transmission provided in the embodiment of the present disclosure, the device may send the beam configuration information to the terminal such that the terminal selects the multiple candidate beams according to the beam configuration information, and further receives the data sent by the base station according to the multiple candidate beams, so that a multi-beam data receiving solution is implemented, a probability of packet loss in a process that the base station sends the data to the terminal is reduced, and data receiving reliability and data receiving effectiveness are improved.

With respect to the device in the above embodiment, the specific manners for performing operations for individual portions therein have been described in detail in the embodiment regarding the method, which will not be elaborated herein.

Figure 7:
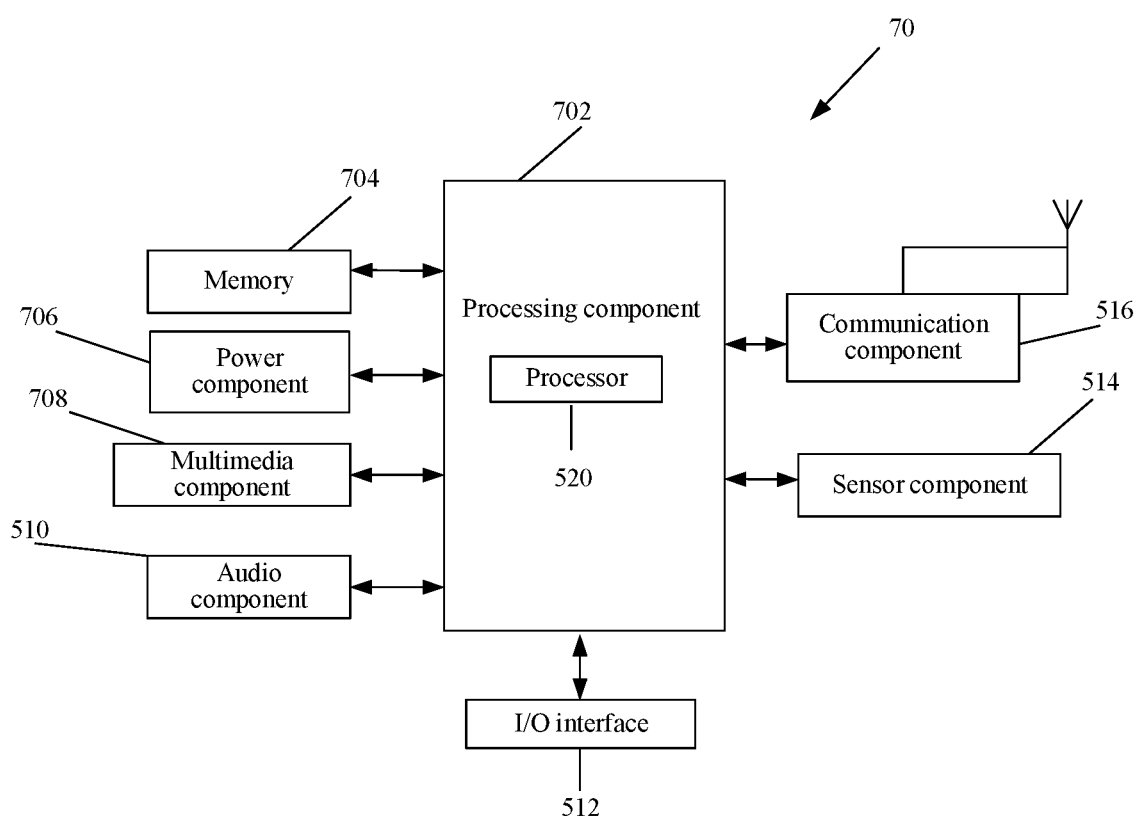
FIG. 7 is a structure block diagram of a device for data transmission, according to some embodiments of the present disclosure.

FIG. 7 is a structure block diagram of a device 70 for data transmission, according to some embodiments of the present disclosure. The device 70 is applied to a terminal device. For example, the device 70 may be a mobile phone, a computer, a digital broadcast terminal, a messaging device, a gaming console, a tablet, a medical device, exercise equipment, a personal digital assistant and the like.

The device 70 may include one or more of the following components: a processing component 702, a memory 704, a power component 706, a multimedia component 708, an audio component 710, an Input/Output (I/O) interface 712, a sensor component 714, and a communication component 716.

The processing component 702 typically controls overall operations of the device 70, such as the operations associated with display, telephone calls, data communications, camera operations, and recording operations. The processing component 702 may include one or more processors 720 to execute instructions to perform all or part of the blocks in the abovementioned method. Moreover, the processing component 702 may include one or more portions which facilitate interaction between the processing component 702 and the other components. For instance, the processing component 702 may include a multimedia portion to facilitate interaction between the multimedia component 708 and the processing component 702.

The memory 704 is configured to store various types of data to support the operation of the device 70. Examples of such data include instructions for any application programs or methods operated on the device 70, contact data, phonebook data, messages, pictures, video, etc. The memory 704 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 706 provides power for various components of the device 70. The power component 706 may include a power management system, one or more power supplies, and other components associated with generation, management and distribution of power for the device 70.

The multimedia component 708 includes a screen providing an output interface between the device 70 and a user. In some embodiments, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 708 includes a front camera and/or a rear camera. The front camera and/or the rear camera may receive external multimedia data when the device 70 is in an operation mode, such as a photographing mode or a video mode. Each of the front camera and the rear camera may be a fixed optical lens system or have focusing and optical zooming capabilities.

The audio component 710 is configured to output and/or input an audio signal. For example, the audio component 710 includes a Microphone (MIC), and the MIC is configured to receive an external audio signal when the device 70 is in the operation mode, such as a call mode, a recording mode and a voice recognition mode. The received audio signal may further be stored in the memory 704 or sent through the communication component 716. In some embodiments, the audio component 710 further includes a speaker configured to output the audio signal.

The I/O interface 712 provides an interface between the processing component 702 and a peripheral interface module, and the peripheral interface module may be a keyboard, a click wheel, a button and the like. The button may include, but not limited to: a home button, a volume button, a starting button and a locking button.

The sensor component 714 includes one or more sensors configured to provide status assessment in various aspects for the device 70. For instance, the sensor component 714 may detect an on/off status of the device 70 and relative positioning of components, such as a display and small keyboard of the device 70, and the sensor component 714 may further detect a change in a position of the device 70 or a component of the device 70, presence or absence of contact between the user and the device 70, orientation or acceleration/deceleration of the device 70 and a change in temperature of the device 70. The sensor component 714 may include a proximity sensor configured to detect presence of an object nearby without any physical contact. The sensor component 714 may also include a light sensor, such as a Complementary Metal Oxide Semiconductor (CMOS) or Charge Coupled Device (CCD) image sensor, configured for use in an imaging application. In some embodiments, the sensor component 714 may also include an acceleration sensor, a gyroscope sensor, a magnetic sensor, a pressure sensor or a temperature sensor.

The communication component 716 is configured to facilitate wired or wireless communication between the device 70 and other equipment. The device 70 may access a communication-standard-based wireless network, such as a Wireless Fidelity (Wi-Fi) network, a 2nd-Generation (2G), 3rd-Generation (3G), $4^{th}$-Generation (4G), or $5^{th}$-Generation (5G) network or a combination thereof. In some embodiments of the present disclosure, the communication component 716 receives a broadcast signal or broadcast associated information from an external broadcast management system through a broadcast channel. In some embodiments of the present disclosure, the communication component 716 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the device 70 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium includes an instruction, such as the memory 704 includes an instruction, and the instruction may be executed by the processor 720 of the device 70 to implement the abovementioned method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

Figure 8:
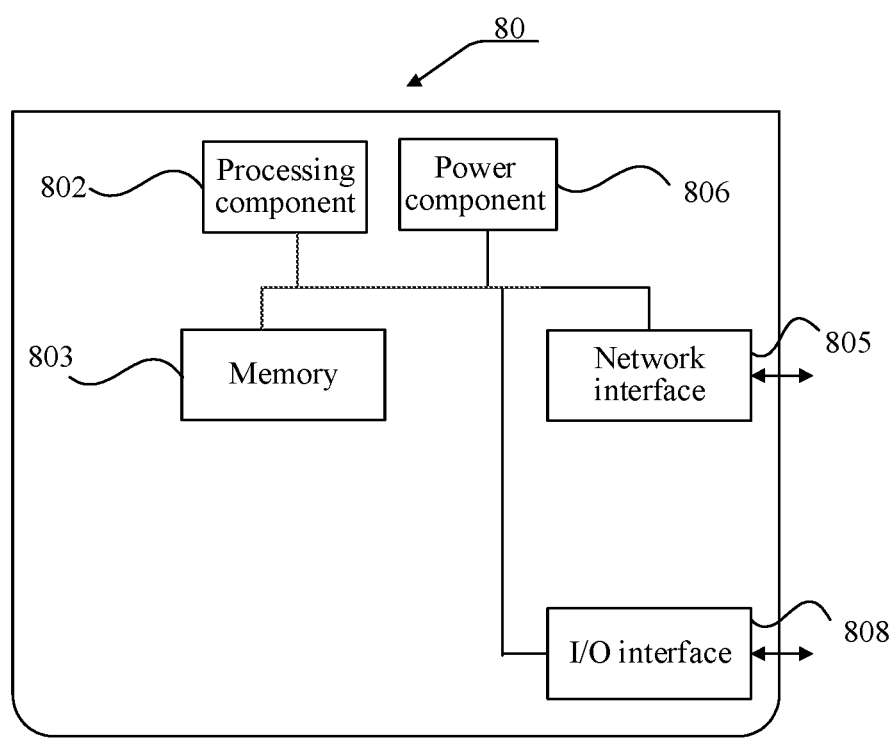
FIG. 8 is a structure block diagram of a device for data transmission, according to some embodiments of the present disclosure.

FIG. 8 is a block diagram of a device 80 for data transmission, according to some embodiments of the present disclosure. For example, the device 80 may be provided as a service, and the server is configured for a base station. The device 80 includes a processing component 802, further includes one or more processors, and a memory resource represented by a memory 803, configured to store an instruction executable for the processing component 802, for example, an application program. The application program stored in the memory 803 may include one or more than one portion of which each corresponds to a set of instructions. In addition, the processing component 802 is configured to execute the instruction to execute the abovementioned method.

The device 80 may further include a power component 806 configured to execute power management of the device 80, a wired or wireless network interface 805 configured to connect the device 80 to a network and an I/O interface 808. The device 80 may be operated based on an operating system stored in the memory 803, for example, Windows Server™, Mac OS X™, Unix™, Linux, FreeBSD™ or the like.

Some embodiments of the present disclosure provide a non-transitory computer-readable storage medium, an instruction in the storage medium being executed by the processor of the device 70 such that the device 70 to execute a method for data transmission for a terminal side, the method includes that:

beam configuration information sent by a base station is received;

multiple candidate beams are acquired from multiple beams which are supported by the base station, according to the beam configuration information; and data is received according to the multiple candidate beams.

In some embodiments, the beam configuration information includes pilot configuration information and beam transmission information of the multiple beams. The pilot configuration information indicates a pilot configuration of each of the multiple beams which are supported by the base station, and the beam transmission information indicates a time-frequency resource for transmission of each of the multiple beams.

In some embodiments, the pilot configuration information includes a pilot time-frequency position and pilot sending strength, and the operation that the multiple candidate beams are acquired, from the multiple beams which are supported by the base station, according to the beam configuration information includes that: each of the multiple beams is measured according to the pilot time-frequency position of each of the multiple beams to acquire a pilot measurement result of each beam; and the multiple candidate beams are acquired from the multiple beams according to the pilot measurement result of each beam.

In some embodiments, the operation that each of the multiple beams is measured according to the pilot time-frequency position of each of the multiple beams to acquire the pilot measurement result of each beam includes that: beam selection information sent by the base station is received, herein the beam selection information indicates multiple selectable beams, which are designed to the terminal by the base station, of the multiple beams, and indicates measurement time of each of the multiple selectable beams; the pilot time-frequency position and the pilot sending strength of each selectable beam are acquired according to the beam configuration information; each selectable beam is measured according to the pilot time-frequency position of each selectable beam and according to the measurement time of each selectable beam to acquire the pilot measurement result of each selectable beam. The operation that the multiple candidate beams are acquired from the multiple beams according to the pilot measurement result of each beam includes that: the multiple candidate beams are acquired from the multiple selectable beams according to the pilot measurement result of each selectable beam.

In some embodiments, the method further includes that: candidate beam feedback information is generated according to the acquired multiple candidate beams, herein the candidate beam feedback information indicates the multiple candidate beams acquired by the terminal; and the candidate beam feedback information is sent to the base station.

In some embodiments, the operation that the candidate beam feedback information is sent to the base station includes that: first resource configuration information sent by the base station is received, herein the first resource configuration information includes a time-frequency resource which is designed by the base station and is used to send the candidate beam feedback information; and the candidate beam feedback information is sent to the base station via the time-frequency resource in the first resource configuration information.

In some embodiments, the operation that the candidate beam feedback information is sent to the base station includes that: the candidate beam feedback information is sent to the base station via a preset time-frequency resource.

In some embodiments, the operation that the data is received according to the multiple candidate beams includes that: second resource configuration information sent by the base station is received, herein the second resource configuration information includes multiple target beams, which are allocated to the terminal by the base station for data reception, of the multiple candidate beams and includes the time-frequency resources for transmission of the multiple target beams; and the data is received in the time-frequency resources for transmission of the multiple target beams via the multiple target beams.

In some embodiments, the method further includes that: a resource configuration request is sent to the base station such that the base station to send the second resource configuration information to the terminal according to the resource configuration request.

In some embodiments, the operation that the data is received according to the multiple candidate beams includes that: third resource configuration information sent by the base station is received, herein the third resource configuration information includes multiple target time-frequency resources allocated to the terminal by the base station; multiple target beams corresponding to the multiple target time-frequency resources are acquired according to correspondences between time-frequency resources and beams, herein the correspondences between the time-frequency resources and the beams indicates correspondences between different time-frequency resources and different beams; and the data is received in the multiple target time-frequency resources via the multiple target beams.

In some embodiments, the method further includes that: pre-configuration information sent by the base station is received. The pre-configuration information includes the correspondences between the time-frequency resources and the beams.

An embodiment of the present disclosure provides a non-transitory computer-readable storage medium, an instruction in the storage medium being executed by the processor of the device 80 such that the device 80 to execute the data transmission method for a base station side, the method includes:

beam configuration information is sent to a terminal such that the terminal selects, according to the beam configuration information, multiple candidate beams from multiple beams which are supported by a base station and receives data according to the multiple candidate beams.

In some embodiments, candidate beam feedback information sent by the terminal is received, herein the candidate beam feedback information indicates the multiple candidate beams acquired by the terminal from the multiple beams; multiple target beams, which are used for data reception, of the multiple candidate beams, and time-frequency resources for transmission of the multiple target beams are allocated to the terminal according to the candidate beam feedback information; and second resource configuration information is sent to the terminal according to the multiple target beams and the time-frequency resources for transmission of the multiple target beams such that the terminal receives the data according to the second resource configuration information.

In some embodiments, the method further includes: the candidate beam feedback information sent by the terminal is received, herein the candidate beam feedback information indicates the multiple candidate beams acquired by the terminal from the multiple beams; multiple target time-frequency resources are allocated to the terminal from multiple time-frequency resources of the multiple candidate beams according to the candidate beam feedback information; and third resource configuration information is sent to the terminal according to the multiple target time-frequency resources such that the terminal acquires target beams corresponding to the multiple target time-frequency resources according to the third resource configuration information and pre-stored correspondences between time-frequency resources and beams and receives the data in the multiple target time-frequency resources according to the multiple target beams.

In some embodiments, the method further includes: pre-configuration information is sent to the terminal, and the pre-configuration information includes the correspondences between the time-frequency resources and the beams.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for data transmission, applied to a terminal and comprising:
   receiving beam configuration information sent by a base station;
   acquiring, according to the beam configuration information, a plurality of candidate beams from a plurality of beams which are supported by the base station; and
   receiving data according to the plurality of candidate beams;
   wherein the beam configuration information comprises pilot configuration information and beam transmission information of the plurality of beams, the pilot configuration information indicates a pilot configuration of each of the plurality of beams which are supported by the base station, and the beam transmission information indicates a time-frequency resource for transmission of each of the plurality of beams.

2. The method of claim 1,
   wherein the pilot configuration information comprises a pilot time-frequency position and pilot sending strength, and
   the acquiring, according to the beam configuration information, the plurality of candidate beams from the plurality of beams which are supported by the base station comprises:
   measuring, according to the pilot time-frequency position of each of the plurality of beams, the beam to acquire a pilot measurement result of the beam; and
   acquiring, according to pilot measurement results of the plurality of beams, the plurality of candidate beams from the plurality of beams.

3. The method of claim 2, wherein
   the measuring, according to the pilot time-frequency position of each of the plurality of beams, the beam to acquire the pilot measurement result of the beam comprises:
   receiving beam selection information sent by the base station, wherein the beam selection information indicates a plurality of selectable beams, which are designated by the base station to the terminal, of the plurality of beams, and indicates measurement time of each of the plurality of selectable beams,
   acquiring, according to the beam configuration information, the pilot time-frequency position and the pilot sending strength of each selectable beam, and
   measuring, according to the pilot time-frequency position of each selectable beam and according to the measurement time of the selectable beam, the selectable beam to acquire the pilot measurement result of the selectable beam; and
   the acquiring, according to pilot measurement results of the plurality of beams, the plurality of candidate beams from the plurality of beams comprises:
   acquiring, according to pilot measurement results of the plurality of selectable beams, the plurality of candidate beams from the plurality of selectable beams.

4. The method of claim 1, further comprising:
   generating, according to the acquired plurality of candidate beams, candidate beam feedback information, wherein the candidate beam feedback information indicates the plurality of candidate beams acquired by the terminal; and
   sending the candidate beam feedback information to the base station.

5. The method of claim 4, wherein the sending the candidate beam feedback information to the base station comprises:
   receiving first resource configuration information sent by the base station, wherein the first resource configuration information comprises a time-frequency resource which is designated by the base station and is used to send the candidate beam feedback information; and sending the candidate beam feedback information to the base station via the time-frequency resource in the first resource configuration information; or
   sending the candidate beam feedback information to the base station via a preset time-frequency resource.

6. The method of claim 4, wherein the receiving the data according to the plurality of candidate beams comprises:
   receiving second resource configuration information sent by the base station, wherein the second resource configuration information comprises a plurality of target beams, which are allocated by the base station to the terminal for data reception, of the plurality of candidate beams, and comprises time-frequency resources for transmission of the plurality of target beams; and
   receiving the data in the time-frequency resources for transmission of the plurality of target beams via the plurality of target beams; and
   wherein the method further comprises:
   sending a resource configuration request to the base station such that the base station sends the second resource configuration information to the terminal according to the resource configuration request.

7. The method of claim 4, wherein the receiving the data according to the plurality of candidate beams comprises:
   receiving third resource configuration information sent by the base station, wherein the third resource configuration information comprises a plurality of target time-frequency resources allocated to the terminal by the base station;
   acquiring, according to correspondences between time-frequency resources and beams, a plurality of target beams corresponding to the plurality of target time-frequency resources, wherein the correspondences between the time-frequency resources and the beams indicate correspondences between different time-frequency resources and different beams; and
   receiving the data in the plurality of target time-frequency resources via the plurality of target beams.

8. The method of claim 7, further comprising:
   receiving pre-configuration information sent by the base station, wherein the pre-configuration information comprises the correspondences between the time-frequency resources and the beams.

9. A method for data transmission, applied to a base station and comprising:
   sending beam configuration information to a terminal to facilitate the terminal selecting, according to the beam configuration information, a plurality of candidate beams from a plurality of beams which are supported by the base station; and receiving data according to the plurality of candidate beams;
   wherein the beam configuration information comprises pilot configuration information and beam transmission information of the plurality of beams, the pilot configuration information indicates a pilot configuration of each of the plurality of beams which are supported by the base station, and the beam transmission information indicates a time-frequency resource for transmission of each of the plurality of beams.

10. The method of claim 9, further comprising:
receiving candidate beam feedback information sent by the terminal, wherein the candidate beam feedback information indicates the plurality of candidate beams acquired by the terminal from the plurality of beams;
allocating, according to the candidate beam feedback information, to the terminal a plurality of target beams, which are used for data reception, of the plurality of candidate beams, and time-frequency resources for transmission of the plurality of target beams; and
sending, according to the plurality of target beams and the time-frequency resources for transmission of the plurality of target beams, second resource configuration information to the terminal such that the terminal receives the data according to the second resource configuration information.

11. The method of claim 9, further comprising:
receiving candidate beam feedback information sent by the terminal, wherein the candidate beam feedback information indicates the plurality of candidate beams acquired by the terminal from the plurality of beams;
allocating, according to the candidate beam feedback information, to the terminal a plurality of target time-frequency resources from a plurality of time-frequency resources of the plurality of candidate beams; and
sending, according to the plurality of target time-frequency resources, third resource configuration information to the terminal such that the terminal acquires target beams corresponding to the plurality of target time-frequency resources according to the third resource configuration information and pre-stored correspondences between time-frequency resources and beams, and receives the data in the plurality of target time-frequency resources according to the plurality of target beams.

12. The method of claim 11, further comprising:
sending pre-configuration information to the terminal, wherein the pre-configuration information comprises the correspondences between the time-frequency resources and the beams.

13. A device for data transmission, comprising:
a processor; and
memory storing instructions for execution by the processor, to:
receive beam configuration information sent by a base station;
acquire, according to the beam configuration information, a plurality of candidate beams from a plurality of beams which are supported by the base station; and
receive data according to the plurality of candidate beams;
wherein the beam configuration information comprises pilot configuration information and beam transmission information of the plurality of beams, the pilot configuration information indicates a pilot configuration of each of the plurality of beams which are supported by the base station, and the beam transmission information indicates a time-frequency resource for transmission of each of the plurality of beams.

14. The device of claim 13,
wherein the pilot configuration information comprises a pilot time-frequency position and pilot sending strength, and
wherein the processor is further configured to:
measure, according to the pilot time-frequency position of each of the plurality of beams, the beam to acquire a pilot measurement result of the beam; and
acquire, according to pilot measurement results of the plurality of beams, the plurality of candidate beams from the plurality of beams.

15. The device of claim 14, wherein the processor is further configured to:
receive beam selection information sent by the base station, wherein the beam selection information indicates a plurality of selectable beams, which are designated by the base station to the terminal, of the plurality of beams, and indicates measurement time of each of the plurality of selectable beams,
acquire, according to the beam configuration information, the pilot time-frequency position and pilot sending strength of selectable beam,
measure, according to the pilot time-frequency position of each selectable beam and according to the measurement time of each selectable beam, the selectable beam to acquire the pilot measurement result of the selectable beam; and
acquire, according to pilot measurement results of the plurality of selectable beams, the plurality of candidate beams from the plurality of selectable beam.

16. The device of claim 13, wherein the processor is further configured to:
generate, according to the acquired plurality of candidate beams, candidate beam feedback information, wherein the candidate beam feedback information indicates the plurality of candidate beams acquired by the terminal; and
send the candidate beam feedback information to the base station.

17. The device of claim 16, wherein the processor is further configured to:
receive first resource configuration information sent by the base station, wherein the first resource configuration information comprises a time-frequency resource which is designed by the base station and is used to send the candidate beam feedback information, and send the candidate beam feedback information to the base station via the time-frequency resource in the first resource configuration information; or
send the candidate beam feedback information to the base station via a preset time-frequency resource.

18. The device of claim 16, wherein the processor is further configured to:
receive second resource configuration information sent by the base station, wherein the second resource configuration information comprises a plurality of target beams, which are allocated by the base station to the terminal for data reception, of the plurality of candidate beams and comprises the time-frequency resources for transmission of the plurality of target beams;
receive the data in the time-frequency resources for transmission of the plurality of target beams via the plurality of target beams; and
send a resource configuration request to the base station such that the base station sends the second resource configuration information to the terminal according to the resource configuration request.

19. The device of claim 16, wherein the processor is further configured to:
receive third resource configuration information sent by the base station, wherein the third resource configuration information comprises a plurality of target time-frequency resources allocated to the terminal by the base station;

acquire, according to correspondences between time-frequency resources and beams, a plurality of target beams corresponding to the plurality of target time-frequency resources, wherein the correspondences between the time-frequency resources and the beams indicate correspondences between different time-frequency resources and different beams;

receive the data in the plurality of target time-frequency resources via the plurality of target beams; and receive pre-configuration information sent by the base station, wherein the pre-configuration information comprises the correspondences between the time-frequency resources and the beams.

20. A communication system implementing the method of claim 1, comprising the terminal and the base station, wherein the base station is configured to send the beam configuration information to the terminal to facilitate the terminal selecting, according to the beam configuration information, the plurality of candidate beams from the plurality of beams which are supported by the base station; and receiving data according to the plurality of candidate beams, thereby realizing a multi-beam data receiving solution, reducing a probability of packet loss in a process that the base station sends the data to the terminal, and improving data receiving reliability and data receiving effectiveness.

* * * * *